United States Patent
Basu et al.

(10) Patent No.: US 11,275,680 B2
(45) Date of Patent: Mar. 15, 2022

(54) PROFILE AND QUEUE-BASED WEAR LEVELING OF MEMORY DEVICES

(71) Applicant: Micron Technology, Inc., Boise, ID (US)

(72) Inventors: Reshmi Basu, Boise, ID (US); Richard Donald Maes, II, Liberty Lake, WA (US); Katie Blomster Park, Liberty Lake, WA (US); Robert J. Pintar, Spokane, WA (US); Gary A. Johnson, Spokane Valley, WA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/786,029

(22) Filed: Feb. 10, 2020

(65) Prior Publication Data

US 2021/0248063 A1 Aug. 12, 2021

(51) Int. Cl.
*G06F 12/02* (2006.01)

(52) U.S. Cl.
CPC .. *G06F 12/0246* (2013.01); *G06F 2212/1036* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 10,282,096 B1 | 5/2019 | Boyle | |
| 10,642,505 B1* | 5/2020 | Kuzmin | G06F 3/0685 |
| 2012/0030413 A1* | 2/2012 | Miyagawa | G06F 12/0246 711/103 |
| 2013/0198439 A1 | 8/2013 | Kurotsuchi et al. | |
| 2013/0198479 A1* | 8/2013 | Jones | G06F 9/5016 711/170 |
| 2015/0032949 A1* | 1/2015 | Miura | G06F 12/0246 711/103 |
| 2015/0220433 A1 | 8/2015 | Schmidberger | |
| 2016/0139817 A1 | 5/2016 | Harijono et al. | |
| 2018/0349645 A1 | 12/2018 | Helmick et al. | |
| 2020/0401332 A1* | 12/2020 | Ravimohan | G06F 3/0616 |

OTHER PUBLICATIONS

Notice of Allowance, U.S. Appl. No. 16/436,079, dated Jul. 7, 2020, 10 pages.

* cited by examiner

*Primary Examiner* — Stephanie Wu

(74) *Attorney, Agent, or Firm* — Nicholson De Vos Webster & Elliott LLP

(57) ABSTRACT

A method is described that includes receiving a write request with user data and a logical address and select a next address queue from a plurality of next address queues based on a reciprocal relationship between short-term usage information associated with the logical address and a set of characteristics of the selected next address queue. Each next address queue in the plurality of next address queues stores physical addresses that are designated to be used for fulfilling write requests. Further, a next physical address is removed from the selected next address queue and the user data of the write request is written to the next physical address in a memory device.

20 Claims, 15 Drawing Sheets

LOGICAL-TO-PHYSICAL (L2P) TABLE 302

| LOGICAL ADDRESS 404 | PHYSICAL ADDRESS 406 | SHORT-TERM (ST) USAGE INFORMATION 408 | | |
|---|---|---|---|---|
| | | ST WRITE COUNT 408A | ST READ COUNT 408B | HISTORY STATE 408C |
| LOG_0 | PHY_0 | 0000000 | 000 | 000 |
| LOG_1 | PHY_1 | 0000000 | 000 | 000 |
| LOG_2 | PHY_2 | 0000000 | 000 | 000 |
| LOG_3 | PHY_3 | 0000000 | 000 | 000 |
| LOG_4 | PHY_4 | 0000000 | 000 | 000 |
| LOG_5 | PHY_5 | | | |
| ... | ... | | | |

| LOGICAL-TO-PHYSICAL (L2P) TABLE 402 | | | | |
|---|---|---|---|---|
| LOGICAL ADDRESS 404 | PHYSICAL ADDRESS 406 | SHORT-TERM (ST) USAGE INFORMATION 408 | | |
| | | ST WRITE COUNT 408A | ST READ COUNT 408B | HISTORY STATE 408C |
| LOG_0 | PHY_0 | 0000000 | 000 | 000 |
| LOG_1 | PHY_35 | 0000001 | 000 | 000 |
| LOG_2 | PHY_2 | 0000000 | 000 | 000 |
| LOG_3 | PHY_3 | 0000000 | 000 | 000 |
| LOG_4 | PHY_4 | 0000000 | 000 | 000 |
| LOG_5 | PHY_5 | | | |
| ... | ... | | | |

FIG. 9

PROFILE AND QUEUE-BASED WEAR LEVELING OF MEMORY DEVICES

TECHNICAL FIELD

The present disclosure generally relates to wear leveling memory devices, and more specifically, relates to profile and queue-based wear leveling of memory devices.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 shows a logical-to-physical table, including logical to physical address mappings and short-term usage information, in accordance with some embodiments of the present disclosure.

FIG. 9 shows the logical-to-physical table after updating an entry to reflect a new logical to physical address mapping, in accordance with some embodiments of the present disclosure.

DETAILED DESCRIPTION

Figure 1:
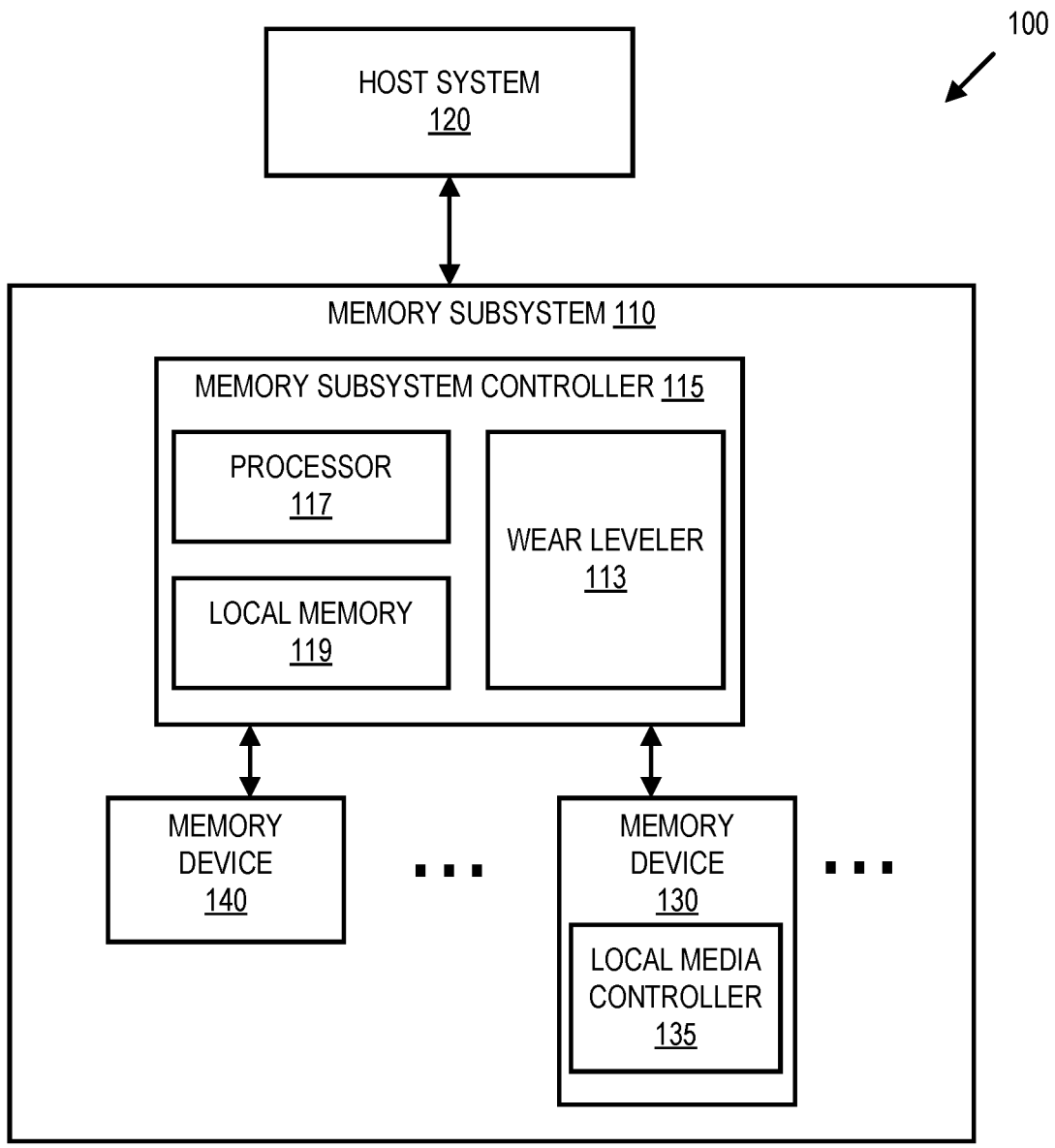
FIG. 1 illustrates an example computing system that includes a memory subsystem, in accordance with some embodiments of the present disclosure.

Aspects of the present disclosure are directed to profile and queue-based wear leveling of memory devices in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory device is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, an SLC can store one bit of information and has two logic states.

A memory device includes a set of memory cells and each memory cell is individually addressable and writeable. Although memory devices provide flexibility in allowing a fine granularity for accessing memory cells, each memory cell has a limited number of read and write cycles before becoming unreliable for data storage. For instance, a memory cell, on average, could allow for 10,000,000 read operations and 3,000,000 write operations before the memory cell becomes unreliable (e.g., writes to the memory cell are unsuccessful or data stored in the memory cell is otherwise lost). Accordingly, based on the limited durability of memory cells, some memory cells can begin to fail before other memory cells in a memory device as a result of a disproportionate number of read and/or write operations to the failed memory cells. For example, a first application of a host device could be allocated a first set of memory cells in a memory device while a second application of the host device could be allocated a second set of memory cells in the memory device. In this example, the first application could be very active with many read and/or write requests for the first set of memory cells while the second application could be comparatively inactive or idle with a lesser number of read and/or write requests in relation to the second set of memory cells. Since each memory cell in the first and second sets of memory cells has similar durability characteristics (e.g., each memory cell could allow 10,000,000 read operations and 3,000,000 write operations before the memory cell becomes unreliable), the first set of memory cells will likely begin to fail before the second set of memory cells.

To ensure consistent wear across memory cells and, thus, extend the period of time before a memory cell fails in the memory device (e.g., extend the period of time before any single memory cell meets the threshold numbers of reads and/or writes before likely failure), wear leveling can be performed across memory cells. Wear leveling prolongs the service life of some kinds of memory devices by attempting to spread read and/or write operations evenly across memory cells. For example, wear leveling can include tracking the number of operations that impact each memory cell and selecting memory cells for write operations based upon the tracked numbers. Accordingly, wear leveling reduces the chances that any memory cell will fail by limiting a disproportionate number of read and/or write operations to any one memory cell. Despite the potential benefits, wear leveling can be resource intensive as it requires considerable amounts of memory and/or computational resources to track write operations across memory cells.

Aspects of the present disclosure address the above and other deficiencies by utilizing a set of low overhead address queues to perform wear leveling of memory cells in a memory subsystem. In particular, the memory subsystem includes a logical-to-physical table, a set of next address queues, and a set of disposal address queues. The logical-to-physical table includes entries that (1) map logical addresses (sometimes referred to as virtual addresses or host addresses), which are used by host systems, to physical addresses of memory cells in a memory device and (2) short-term usage information associated with each corresponding logical address. For example, the short-term usage information can include (1) a short-term write count, which indicates the number of writes to the logical address during a prescribed time period (e.g., five microseconds), (2) a short-term read count, which indicates the number of read operations to the logical address during the prescribed time period, and (3) a history state, which indicates usage information associated with the logical address during an immediately preceding time period (e.g., a read and write count for an immediately preceding time period). Further, each next address queue (1) includes physical addresses that are presently designated to be used to fulfill write requests and (2) is associated with different usage profiles for corresponding physical addresses. For instance, a first next address queue can be associated with a low-read, high-write usage profile (i.e., physical addresses in this next address queue have been involved in a low number of read operations (relative to a long-term read threshold) and a high number of write operations (relative to a long-term write threshold)), a second next address queue is associated with a high-read, low-write usage profile (i.e., physical addresses in this next address queue have been involved in a high number of read operations and a low number of write operations), a third next address queue is associated with leveled reads/writes, high-read, high-write usage profile (i.e., physical addresses in this next address queue have been involved in a high number of read operations and a high number of write operations while still maintaining a ratio of reads to writes consistent with a desired leveling ratio (i.e., leveled with the desired ratio)), etc. In this configuration, in response to a write operation that references a logical address, a wear leveler of the memory subsystem locates a corresponding entry in a logical-to-physical table for the logical address and determines a corresponding next address queue based on the short-term usage information in the entry. Namely, based on the short-term usage information, the wear leveler determines a usage profile for the logical address and a corresponding next address queue with a complimentary profile to retrieve a physical address for performing the write operation. For instance, when the short-term usage information indicates that a low number of read operations but a high number of write operations have been performed in relation to the logical address of the write request, the wear leveler can select a next address queue that is associated with a high-read, low-write usage profile. In this fashion, the memory subsystem selects a physical address for the write operation that could withstand an increased number of read operations, as has been experienced by the logical address, and will benefit from a reduced number of write operations. This selected physical address is added to the entry corresponding to the logical address in the logical-to-physical table to the replace the current/old physical address.

Similarly, the wear leveler can select a disposal address queue for the old physical address that most accurately describes the physical address. In particular, the wear leveler determines a disposal address queue for the old physical address based on long-term usage information for the physical address. In contrast to the short-term usage information associated with logical addresses, the long-term usage information for physical addresses describe how the physical addresses have been used for an extended period of time (e.g., since the memory subsystem was first used). In this configuration, the wear leveler can assign/add the old physical address, which was previously associated with the logical address of the write request, to a disposal address queue with a usage profile that matches or is otherwise similar to the usage profile indicated by the long-term usage information of the old physical address (e.g., when the long-term usage information indicates that the old physical address has had a relatively low number of read operations performed and a low number of write operations, the wear leveler adds the old physical address to a disposal queue that is associated with a low-read, low-write usage profile).

Upon the memory subsystem detecting a triggering event (e.g., a next address queue is empty, a disposal address queue is full, one or more next address queues fall below a depth threshold, etc.), the wear leveler swaps addresses between one or more next address queues and one or more corresponding disposal address queues (i.e., swaps are performed between next address queues and disposal address queues with the same usage profiles). Thus, the physical addresses that were previously not used for write operations (i.e., the physical addresses in the disposal address queues) can now be used for write operations (i.e., the physical addresses in the next address queues). In this fashion, physical addresses and corresponding memory cells are evenly cycled between being ineligible for use for write operations and eligible for use with write operations such that wear leveling can be performed between memory cells. Moreover, the usage profile-based distribution of physical addresses into corresponding queues ensures more consistent wear across memory cells. Further, for selecting a physical address for a write operation, the wear leveling technique described herein reduces the overhead involved in utilizing the number of writes to each memory cell by employing sets of queues within minimum amounts of usage information. Accordingly, wear leveling is performed on memory cells to extend the longevity of the memory device with limited impact on resources.

Although described above in relation to memory cells, wear leveling can be performed in relation to any segment/portion of a memory device (e.g., a codeword, a block, a managed unit, etc.). Accordingly, the discussion of wear leveling in relation to memory cells is for illustrative purposes.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystem 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes wear leveler 113 that can wear level memory devices 130/140 in a memory subsystem 110 using a set of address queues and corresponding usage profiles. In some embodiments, the controller 115 includes at least a portion of the wear leveler 113. For example, the controller 115 can include an integrated circuit and/or a processor 117 (processing device) configured to execute instructions stored in local memory 119 for performing the operations described herein. In some embodiments, the wear leveler 113 is part of the host system 110, an application, or an operating system.

The wear leveler 113 can wear level memory cells in the memory devices 130 using a set of next address queues, which store physical addresses of memory cells that are designated for use in fulfilling write requests according to a set of usage profiles; a set of disposal address queues, which store physical addresses of memory cells that are not designated or are otherwise excluded for use in fulfilling write requests according to the set of usage profiles; and a logical-to-physical table that is used to (1) map logical addresses used by hosts systems to physical addresses of memory cells and (2) store short-term usage information for each logical address. Further details with regards to the operations of the wear leveler 113 are described below.

FIGS. 2A-2D are a flow diagram of an example method 200 to perform profile and queue-based wear leveling, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the wear leveler 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3:
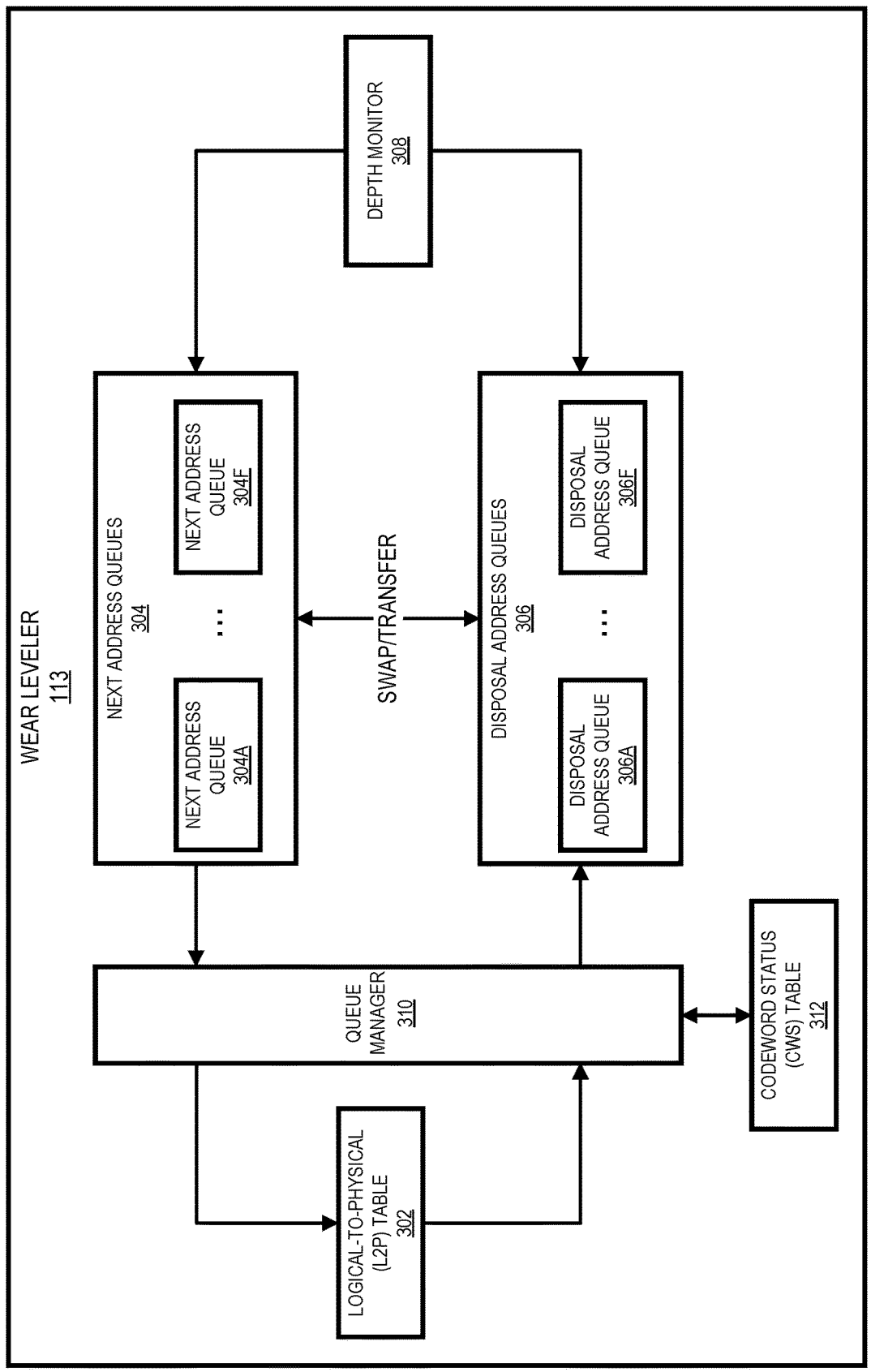
FIG. 3 shows a component layout of a wear leveler, in accordance with some embodiments of the present disclosure.

The method 200 will be described in relation to the wear leveler 113 shown in FIG. 3. In particular, FIG. 3 shows a component layout of a wear leveler 113, according to one example embodiment. As shown, the wear leveler 113 includes (1) a set of next address queues 304A-304F that reference physical addresses, which are currently designated for use in fulfilling write requests, (2) a set of disposal address queues 306A-306F that reference physical addresses, which are currently not designated for use in fulfilling write requests, (3) a logical-to-physical table 302 that stores mappings between logical addresses and physical addresses, (4) a codeword status table 312 that describes the status of memory cells/physical addresses in the memory devices 130/140 (e.g., the codeword status table 312 includes fields that describe whether a memory cell/physical address is dead or free and/or how many read and/or write operations have been performed in relation to the memory cell/physical address), (5) a depth monitor 308 to monitor/track the number of physical addresses currently referenced by each of the next address queues 304A-304F and the disposal addresses queues 306A-306F, and (6) a queue manager 310 for managing various components of wear leveler 113, including determining when the disposal addresses queues 306A-306F are to be swapped with the next address queues 304A-304F. Although described in relation to the wear leveler 113 of FIG. 3, the method 200 can be performed in relation to other configurations of the wear leveler 113. Accordingly, discussion of the method 200 in relation to the wear leveler 113 of FIG. 3 is for illustrative purposes.

At operation 202, the processing device initializes elements for performing wear leveling of the memory devices 130/140. In particular, at operation 202 the processing device (e.g., the queue manager 310) can (1) populate a logical-to-physical table 302 (sometimes referred to as an L2P table 302) for the memory devices 130/140 using a set of physical addresses of the memory devices 130/140 and set of logical addresses of the host system 120, (2) populate a set of next address queues 304 with a set of physical addresses of the memory devices 130/140, and (3) initialize a set of disposal address queues 306 to be empty. For example, FIG. 4 shows a logical-to-physical table 302 following initialization by the processing device at operation 202. As shown in FIG. 4, the logical-to-physical table 302 includes a set of entries $402_0$-$402_5$ and each entry 402 (1) is associated with a logical address 404 that is used by the host system 120 to access the memory devices 130/140 and (2) includes or otherwise references a physical address 406 of the memory devices 130/140. Accordingly, each entry 402 maps an associated logical address 404 to a physical address 406 of the memory devices 130/140. As shown in FIG. 4, the entry $402_0$ is associated with the logical address LOG_0 and references the physical address PHY_0 such that the physical address PHY_0 is mapped to the logical address LOG_0; the entry $402_1$ is associated with the logical address LOG_1 and references the physical address PHY_1 such that the physical address PHY_1 is mapped to the logical address LOG_1; the entry $402_2$ is associated with the logical address LOG_2 and references the physical address PHY_2 such that the physical address PHY_2 is mapped to the logical address LOG_2; the entry $402_3$ is associated with the logical address LOG_3 and references the physical address PHY_3 such that the physical address PHY_3 is mapped to the logical address LOG_3; etc. As used herein, a physical address 406 references or otherwise corresponds to one of a codeword, a memory cell, or a logical block in the memory devices 130/140.

Additionally, each entry 402 in the logical-to-physical table 302 includes short-term usage information 408 associated with each corresponding logical address 404. This short-term usage information 408 describes the use of corresponding logical addresses 404 by the host system 120. In particular, each application running on the host system 120 can be allocated a particular range of logical addresses 404. Further, each application can have different memory demands such that a first application can require greater usage of their allocated logical addresses 404 while a second application can require relatively less usage of their allocation logical addresses 404 (i.e., the first application generates more read and/or write requests for the memory subsystem 110 to fulfill in comparison to the second application). The short-term usage information 408 describes this usage relative to each logical address 404 represented in the logical-to-physical table 302.

As shown in FIG. 4, for each entry 402, the short-term usage information 408 includes (1) a short-term write count 408A, which indicates the number of write operations performed in relation to the associated logical address 404 during a current time period (e.g., five microseconds), (2) a short-term read count 408B, which indicates the number of read operations performed in relation to the associated logical address 404 during the current time period, and (3) a history state 408C, which indicates usage information associated with the associated logical address 404 during an immediately preceding time period (i.e., the time period immediately prior to the current time period such that the current time period commences immediately following the preceding time period and extends for the same length as the preceding time period). For example, if the current time period is T1, the short-term write count 408A and the short-term read count 408B reflect usage during time period T1, while the history state 408C reflects usage during the time period T0, which immediately precedes time period T1. In one embodiment, the processing device sets the short-term usage information 408 for each entry 402 to the value zero (i.e., bits representing each element of the short-term usage information 408 are set to zero) at operation 202.

In one embodiment, the short-term write count 408A and the short-term read count 408B are set/incremented respectively to represent the actual number of write and read operations performed in relation to a corresponding logical address during the current time period, while the history state 408C indicates a set of read, write, and/or read-to-write leveling characteristics. For example, a first value of the history state 408C (e.g., "000") can indicate that during the preceding/previous time period a corresponding logical address 404 was involved in a low amount of read operations (relative to a short-term read threshold) and a high amount of write operations (relative to a short-term write threshold); a second value of the history state 408C (e.g., "001") can indicate that during the preceding/previous time period a corresponding logical address 404 was involved in a high amount of read operations (relative to the short-term read threshold) and a low amount of write operations (relative to the short-term write threshold); a third value of the history state 408C (e.g., "010") can indicate that during the preceding/previous time period a corresponding logical address 404 was involved in a low amount of read operations (relative to the short-term read threshold) and a low amount of write operations (relative to the short-term write threshold); a fourth value of the history state 408C (e.g., "011") can indicate that during the preceding/previous time period a corresponding logical address 404 was involved in a high amount of read operations (relative to the short-term read threshold) and a high amount of write operations (relative to the short-term write threshold); a fifth value of the history state 408C (e.g., "100") can indicate that during the preceding/previous time period a corresponding logical address 404 was involved in a low amount of read operations (relative to the short-term read threshold), a low amount of write operations (relative to the short-term write threshold), and leveled read/write operations (i.e., the ratio of read to write operations satisfies a predefined read/write leveling ratio); and a sixth value of the history state 408C (e.g., "101") can indicate that during the preceding/previous time period a corresponding logical address 404 was involved in a high amount of read operations (relative to the short-term read threshold), a high amount of write operations (relative to the short-term write threshold), and leveled read/write operations. In these embodiments, the short-term write and read thresholds can be set based on the number of read and write operations capable of being represented by the corresponding number of bits for the short-term write count 408A and the short-term read count 408B. For example, since the short-term write count 408A is represented by seven bits, which represents 128 values ($2^7$), the short-term write threshold can be 64 (i.e., 50% of the number of writes capable of being represented by the short-term write count 408A), 96 (i.e., 75% of the number of writes capable of being represented by the short-term write count 408A), etc. Similarly, since the short-term read count 408B is represented by three bits, which represents 8 values ($2^3$), the short-term read threshold can be 4 (i.e., 50% of the number of reads capable of being represented by the short-term read count 408B), 6 (i.e., 75% of the number of reads capable of being represented by the short-term read count 408B), etc.

Although shown as the short-term write count 408A being represented by seven bits, the short-term read count 408B being represented by three bits, and the history state 408C being represented by three bits, the processing device can use any number of bits to represent each of these elements of the short-term usage information 408. For example, in some embodiments, each of the elements of the short-term usage information 408 can be represented by the same number of bits (e.g., the short-term write count 408A can be represented by four bits, the short-term read count 408B being represented by four bits, and the history state 408C being represented by four bits). Accordingly, the representation of FIG. 4 is for purposes of illustration and other embodiments are possible.

Figure 5:
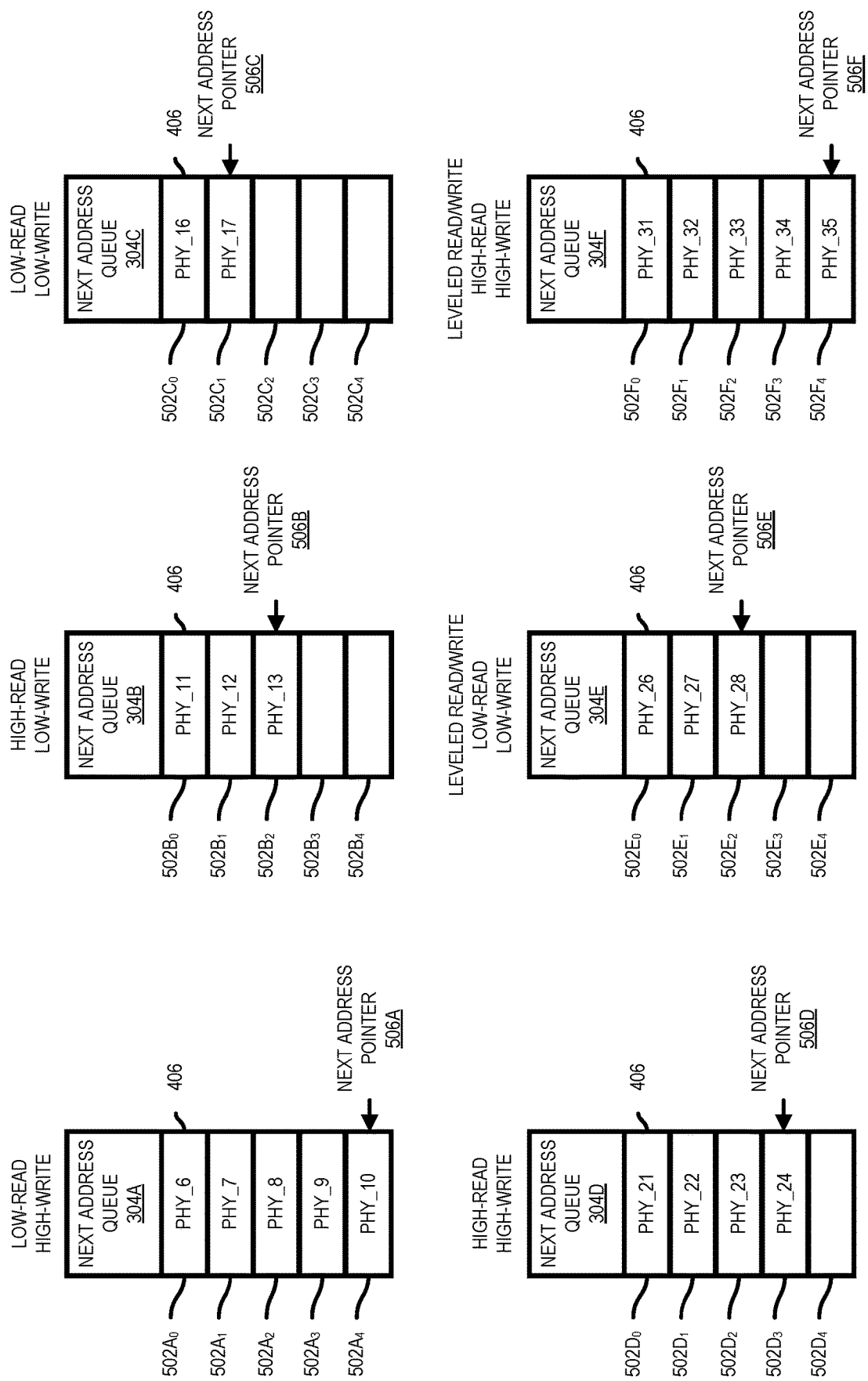
FIG. 5 shows a set of next address queues, in accordance with some embodiments of the present disclosure.

FIG. 5 shows a set of next address queues 304A-304F according to one example embodiment. As shown, each next address queue 304 includes a set of entries 502, which each include or otherwise reference a physical address 406, and each next address queue 304 is associated with a unique set of characteristics. For example, (1) the next address queue 304A includes the entries $502A_0$-$502A_4$ and is associated with a low number of read operations and a high number of write operations (i.e., the physical addresses 406 of these entries $502A_0$-$502A_4$ are associated with a low number of read operations (relative to a long-term read threshold) and a high number of write operations (relative to a long-term write threshold)), (2) the next address queue 304B includes the entries $502B_0$-$502B_4$ and is associated with a high number of read operations and a low number of write operations (i.e., the physical addresses 406 of these entries $502B_0$-$502B_4$ are associated with a high number of read operations and a low number of write operations), (3) the next address queue 304C includes the entries $502C_0$-$502C_4$ and is associated with a low number of read operations and a low number of write operations (i.e., the physical addresses 406 of these entries $502C_0$-$502C_4$ are associated with a low number of read operations and a low number of write operations), (4) the next address queue 304D includes the entries $502D_0$-$502D_4$ and is associated with a high number of read operations and a high number of write operations (i.e., the physical addresses 406 of these entries $502D_0$-$502D_4$ are associated with a high number of read operations and a high number of write operations), (5) the next address queue 304E includes the entries $502E_0$-$502E_4$ and is associated with a low number of read operations, a low number of write operations, and leveled read/write operations (i.e., the physical addresses 406 of these entries $502E_0$-$502E_4$ are associated with a low number of read operations, a low number of write operations, and the ratio of read to write operations satisfies a predefined read/write leveling ratio, and (6) the next address queue 304F includes the entries $502F_0$-$502F_4$ and is associated with a high number of read operations, a high number of write operations, and leveled read/write operations (i.e., the physical addresses 406 of these entries $502F_0$-$502F_4$ are associated with a high number of read operations, a high number of write operations, and the ratio of read to write operations satisfies the predefined read/write leveling ratio). In one embodiment, each memory element/cell referenced by corresponding physical addresses 406 allows 10,000,000 read operations and/or 3,000,000 write operations before the memory element becomes unreliable (e.g., writes to the memory element are unsuccessful or data stored in the memory element is otherwise lost). In this embodiment, the long-term read threshold can be 9,000,000 (i.e., 90% of the maximum allowable number of read operations); 8,000,000 (i.e., 80% of the maximum allowable number of read operations); 7,000,000 (i.e., 70% of the maximum allowable number of read operations); etc. Similarly, in this embodiment, the long-term write threshold can be 2,700,000 (i.e., 90% of the maximum allowable number of write operations); 2,400,000 (i.e., 80% of the maximum allowable number of read operations); 2,100,000 (i.e., 70% of the maximum allowable number of read operations); etc. Further, the leveling ratio, which can also be referred to as the read-to-write ratio) can be 10:3 (i.e., the ratio of the maximum allowable number of read operations to the maximum number of write operations).

Although shown with six next address queues 304, in other embodiments, a different number of next address queues 304 can be used. For example, in some embodiments, in addition to the next address queues 304A-304F, the processing device can also initialize other next address queues 304, including a first next address queue 304 that is associated with a high number of read operations, a low number of write operations, and leveled read/write operations (i.e., the physical addresses 406 in this next address queue 304 are associated with a high number of read operations, a low number of write operations, and the ratio of read to write operations satisfies the predefined read/write leveling ratio) and a second next address queue 304 that is associated with a low number of read operations, a high number of write operations, and leveled read/write operations (i.e., the physical addresses 406 in this next address queue 304 are associated with a low number of read operations, a high number of write operations, and the ratio of read to write operations satisfies the predefined read/write leveling ratio).

In one embodiment, the processing device selects and adds physical addresses 406 to a corresponding next address queue 304 at operation 202 based on (1) the availability of the physical addresses 406 and corresponding memory cells (i.e., the physical addresses 406 are active and free) and (2) associated characteristics. For example, the processing device queries the codeword status table 312 to locate or otherwise determine a set of memory cells and corresponding physical addresses 406 that are free (i.e., not being used to store data). The processing device can further determine characteristics for the physical address 406 (e.g., low or high read operations, low or high write operations, and/or leveling of read and write operation) based on the information in the codeword status table 312 such that the processing device can add the physical addresses 406 to corresponding next address queues 304 with matching or similar characteristics. In one embodiment, the codeword status table 312 can include fields for describing memory cells in the memory devices 130/140, which are represented by separate entries. For example, the codeword status table 312 can include one or more of: (1) a dead field (1 bit), which indicates whether a corresponding memory cell is dead; (2) a free field (1 bit), which indicates whether a corresponding memory cell is free (i.e., whether the memory cell is being used to store data); (3) a VDM field (2 bits), which indicates a read voltage for a corresponding memory cell; (4) a timestamp field (12 bits), which indicates a time of the last read and/or write to a corresponding memory cell; (5) a read disturbance field (13 bits), which indicates a level/degree of disturbance to a corresponding memory cell caused by reads to that memory cell; (6) a write disturbance field (12 bits), which indicates a level/degree of disturbance to a corresponding memory cell caused by writes to adjacent memory cells; (7) a forced write count field (12 bits), which indicates a number of forced writes to a corresponding memory cell; (8) a read count field (23 bits), which indicates a number of writes to a corresponding memory cell; and (9) a write count field (22 bits), which indicates a number of writes to a corresponding memory cell.

As also shown in FIG. 5, the processing device maintains a next address pointer 506 (sometimes referred to as a next address reference 506 or a next address cursor 506) for each next address queue 304. The next address pointer 506 indicates the next physical address 406 in the corresponding next address queue 304 that the processing device will remove and use to perform a write operation. As physical addresses 406 are removed from the next address queue 304 based on the next address pointer 506, the processing device adjusts the next address pointer 506 to point to the next entry 502 and corresponding physical address 406 in the next address queue 304. For example, as shown in FIG. 5, the processing device can cause the next address pointer 506A to move up to the next entry $502A_3$ after the physical address PHY_10, corresponding to the entry $502A_4$, is taken/removed from the next address queue 304A to fulfill a write request. Although shown as using pointers (i.e., the next address pointers 506A-506F), the next address queues 304 can be configured/implemented using any data structure, including a stack, such that an ordered set of physical addresses 406 can be cycled through to fulfill write requests.

Figure 6:
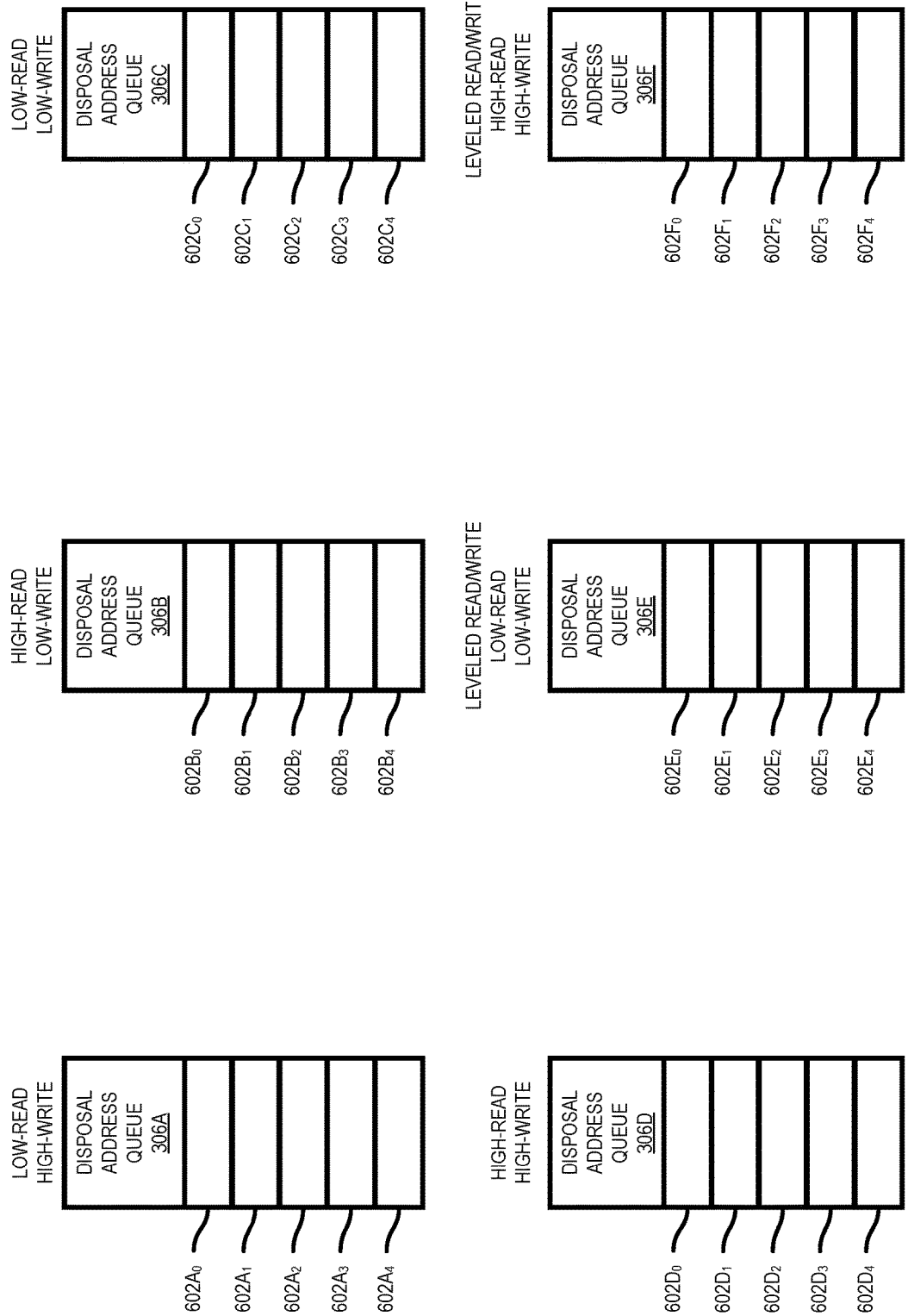
FIG. 6 shows a set of disposal address queues, in accordance with some embodiments of the present disclosure.

FIG. 6 shows a set of disposal address queues 306, according to one example embodiment. Each of the disposal address queues 306 includes a set of entries 602, which can each include or otherwise reference a physical address 406, and each disposal address queue 306 is associated with a unique set of characteristics. For example, (1) the disposal address queue 306A includes the entries $602A_0$-$602A_4$ and is associated with a low number of read operations and a high number of write operations (i.e., the physical addresses 406 of these entries $602A_0$-$602A_4$ are associated with a low number of read operations (relative to a long-term read threshold) and a high number of write operations (relative to a long-term write threshold)), (2) the next address queue 306B includes the entries $602B_0$-$602B_4$ and is associated with a high number of read operations and a low number of write operations (i.e., the physical addresses 406 of these entries $602B_0$-$602B_4$ are associated with a high number of read operations and a low number of write operations), (3) the next address queue 306C includes the entries $602C_0$-$602C_4$ and is associated with a low number of read operations and a low number of write operations (i.e., the physical addresses 406 of these entries $602C_0$-$602C_4$ are associated with a low number of read operations and a low number of write operations), (4) the next address queue 306D includes the entries $602D_0$-$602D_4$ and is associated with a high number of read operations and a high number of write operations (i.e., the physical addresses 406 of these entries $602D_0$-$602D_4$ are associated with a high number of read operations and a high number of write operations), (5) the next address queue 306E includes the entries $602E_0$-$602E_4$ and is associated with a low number of read operations, a low number of write operations, and leveled read/write operations (i.e., the physical addresses 406 of these entries $602E_0$-$602E_4$ are associated with a low number of read operations, a low number of write operations, and the ratio of read to write operations satisfies the predefined read/write leveling ratio), and (6) the next address queue 306F includes the entries $602F_0$-$602F_4$ and is associated with a high number of read operations, a high number of write operations, and leveled read/write operations (i.e., the physical addresses 406 of these entries $602F_0$-$602F_4$ are associated with a high number of read operations, a high number of write operations, and the ratio of read to write operations satisfies the predefined read/write leveling ratio).

Although shown with six disposal address queues 306, in other embodiments, a different number of disposal address queues 306 can be used. For example, in some embodiments, in addition to the disposal address queues 306A-306F, the processing device can also initialize other disposal address queues 306, including a first disposal address queue 306 that is associated with a high number of read operations, a low number of write operations, and leveled read/write operations (i.e., the physical addresses 406 in this disposal address queue 306 are associated with a high number of read operations, a low number of write operations, and the ratio of read to write operations satisfies the predefined read/write leveling ratio) and a second disposal address queue 306 that is associated with a low number of read operations, a high number of write operations, and leveled read/write operations (i.e., the physical addresses 406 in this disposal address queue 306 are associated with a low number of read operations, a high number of write operations, and the ratio of read to write operations satisfies the predefined read/write leveling ratio).

Although during performance of the method 200 the processing device will modify the entries 602 to include physical addresses 406, the processing device can initialize entries 602 in the disposal address queues 306 without reference to physical addresses 406. In particular, as will be described in greater detail below, as the method 200 is performed, the processing device removes physical addresses 406 from the logical-to-physical table 302 and adds these removed physical addresses 406 to entries 602 of a disposal address queue 306 with matching or similar characteristics.

Figure 2A:
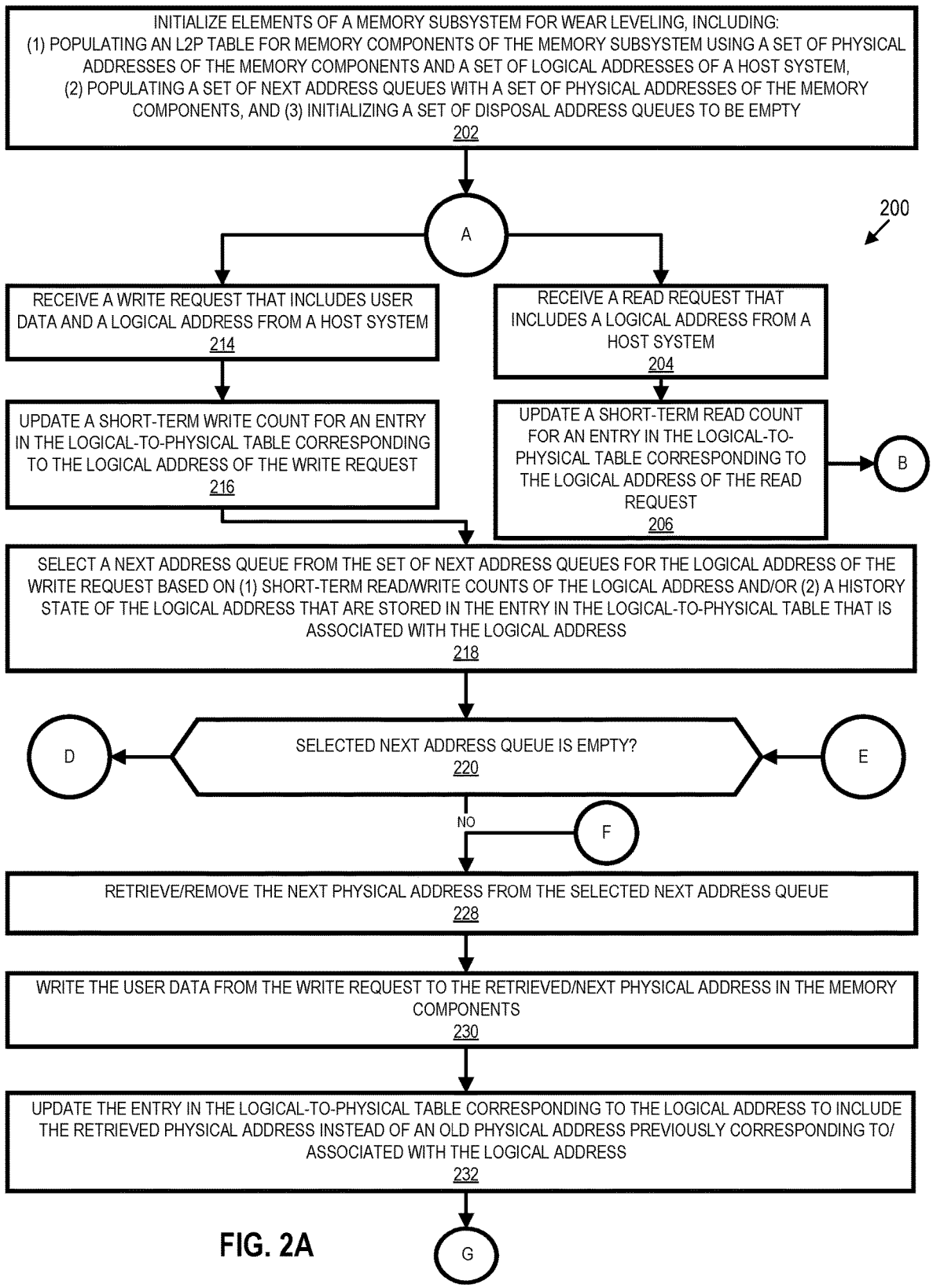
FIGS. 2A-2D are a flow diagram of an example method to perform profile and queue-based wear leveling, in accordance with some embodiments of the present disclosure.
Figure 2B:
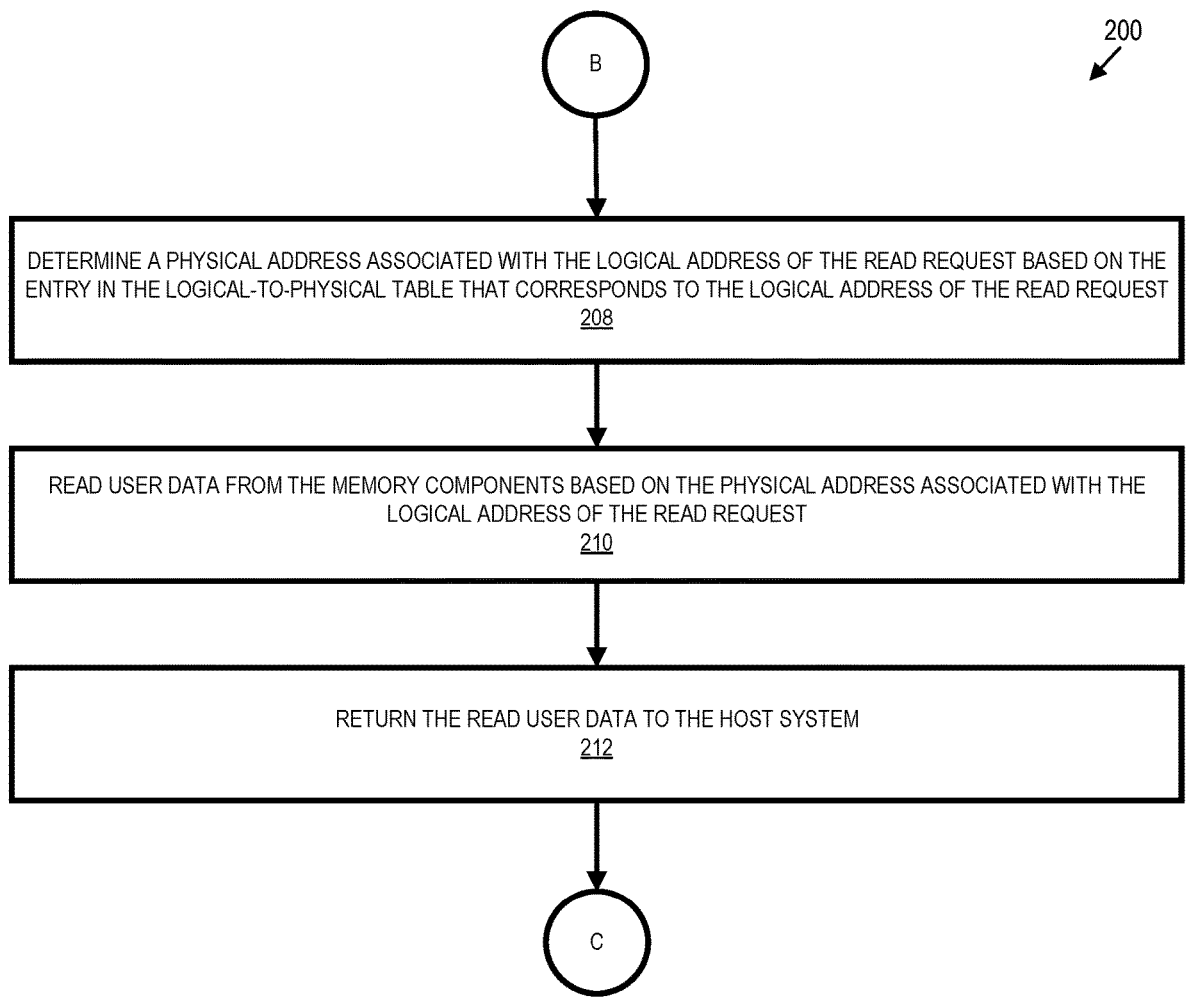
Figure 2C:
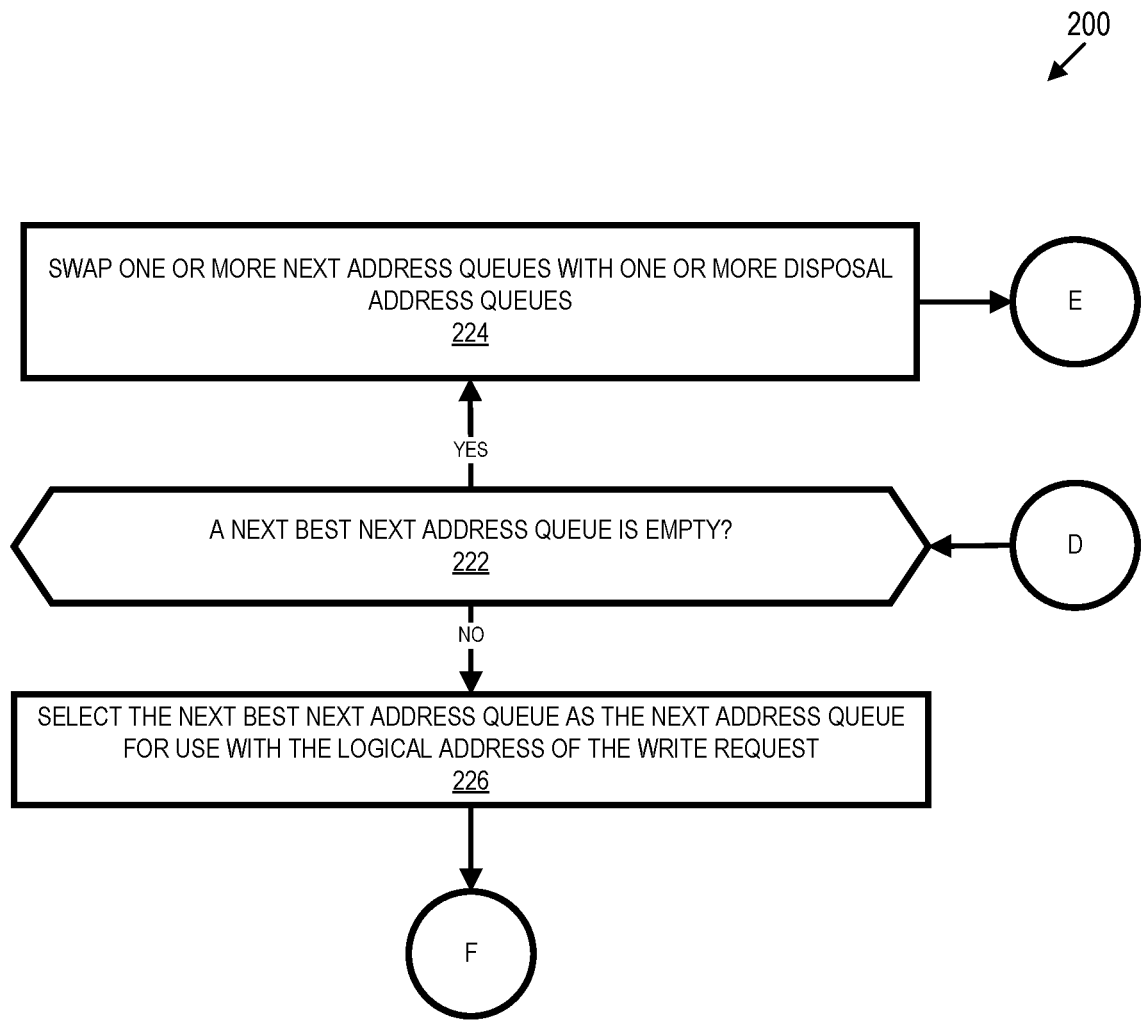
Figure 2D:
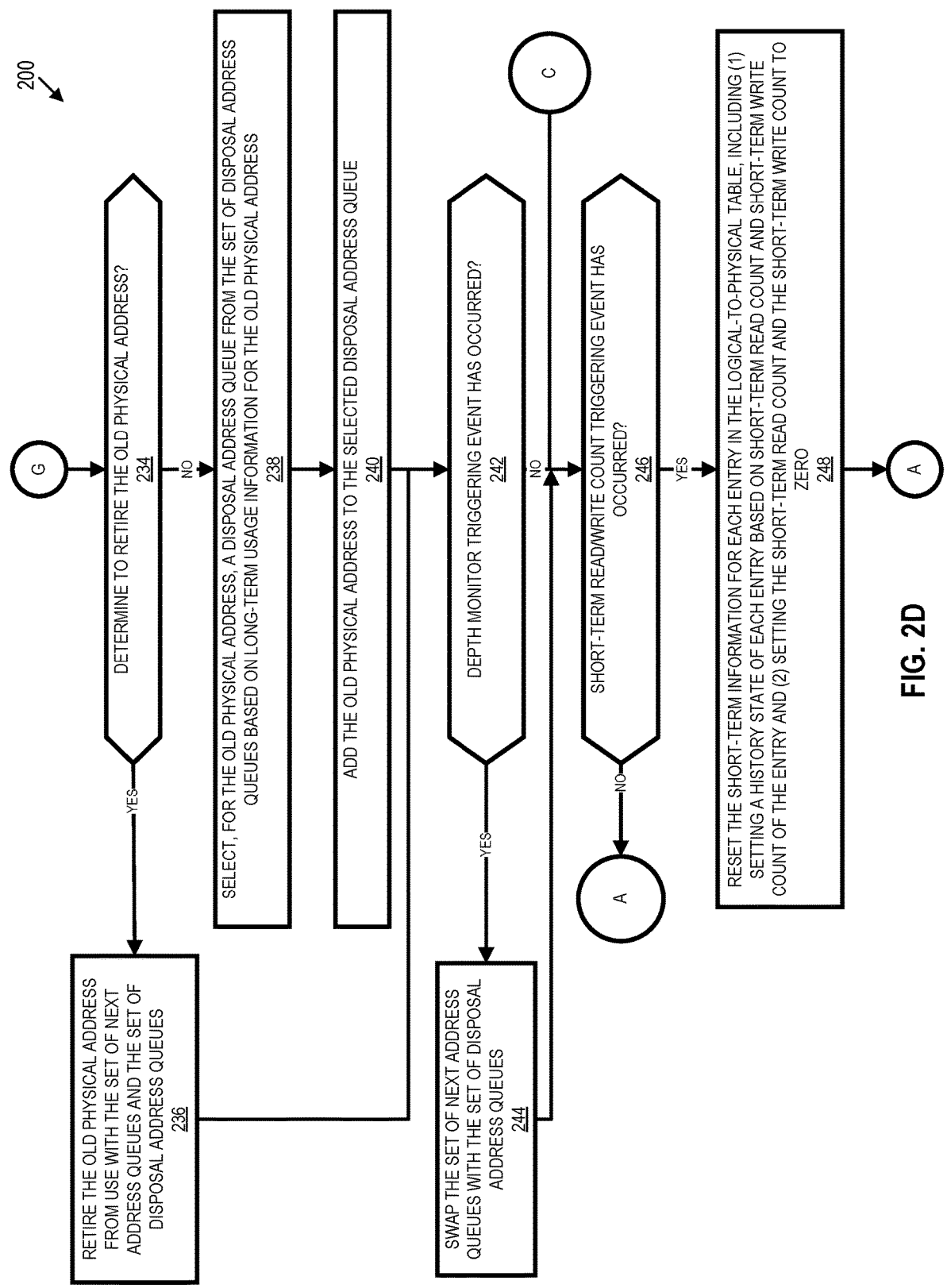

As shown in FIG. 2A, the method 200 can branch to either operation 204 or operation 214 following operation 202, depending on whether the processing device receives a read request or a write request. In particular, at operation 204, the processing device receives a read request, which includes a logical address 404, from the host system 120. For example, the host system 120 could send a read request that seeks to retrieve user data corresponding to a video, image, text, etc. from the memory devices 130/140.

At operation 206, the processing device updates short-term usage information 408 associated with the logical address 404 of the read request. In particular, the processing device (e.g., the queue manager 310) locates the entry 402 in the logical-to-physical table 302 corresponding to the logical address 404 of the read request. Upon locating the entry 402 in the logical-to-physical table 302 corresponding to the logical address 404, the processing device increments the short-term read count 408B for the located entry 402 by one. For example, when the logical address 404 of the received read request is the logical address LOG_2, the processing device increments the short-term read count 408B for the entry $402_2$ from "000" to "001" at operation 206. As noted above, the short-term read count 408B reflects the number of read operations performed in relation to a corresponding logical address 404 during a prescribed time period. Accordingly, the processing device updates the short-term usage information 408 for the logical address 404 to reflect corresponding wear related to the logical address 404 caused by performance of a read operation.

At operation 208, the processing device (e.g., the queue manager 310) determines a physical address 406 for the logical address 404 of the read request based on the located entry 402 in the logical-to-physical table 302 that corresponds to the logical address 404. Using the example above in relation the logical-to-physical table 302 of FIG. 4, when the logical address 404 of the received read request is the logical address LOG_2, the processing device determines the physical address PHY_2 at operation 208.

At operation 210, the processing device reads user data from the memory devices 130/140 based on the physical address 406 determined at operation 208. For example, when the determined physical address 406 is the physical address PHY_2, the processing device reads user data from the physical address PHY_2 of the memory devices 130/140 at operation 210. In some embodiments, reading the user data at operation 210 can include the processing device decoding data stored at the determined physical address 406 to correct for errors introduced to the user data while residing in the memory devices 130/140. For example, the data stored in the memory devices 130/140 can include a set of parity bits that are used to correct for errors in the user data.

In one embodiment, the processing device can update long-term information associated with the determined physical address 406 following the read operation. For example, as described above, the codeword status table 312 can include a read count for each physical address 406 in the memory devices 130/140 corresponding to the number of read operations performed for the physical address 406 at any time during the life of the physical address 406. Accordingly, following the processing device performing a read operation with respect to the determined physical address 406 at operation 210, the processing device can increment a read count associated with the determined physical address 406 in the codeword status table 312. This long-term information in the codeword status table 312 can be used for determining whether a physical address 406 should be retired (e.g., whether a number of read operations performed in relation to a physical address 406 has reached a threshold).

At operation 212, the processing device returns the read user data to the host system 120. In particular, the processing device responds to the received read request from operation 204 by returning the read user data, which corresponds to the logical address 404 of the read request, to the host system 120.

As noted above, following operation 202, the processing device can alternatively perform operation 214 instead of operation 204 based on whether the processing receives a read request (i.e. operation 204) or a write request (i.e., operation 214) from the host system 120. At operation 214, the processing device receives a write request from the host system 120. The write request includes (1) user data to be written to the memory devices 130/140 and (2) a logical address 404. The logical address 404 of the write request corresponds to an entry 402 in the logical-to-physical table 302 that is managed by the processing device. For example, when the logical address 404 is the logical address LOG_1, this logical address 404 corresponds to entry $402_1$, which is initially mapped to the physical address PHY_1 of the memory devices 130/140. As will be described in greater detail below, the processing device will adjust/modify this mapping of the logical address LOG_1 to better ensure wear amongst memory cells in the memory devices 130/140 is level/consistent while fulfilling the write request.

At operation 216, the processing device updates short-term usage information 408 associated with the logical address 404 of the write request. In particular, similar to operation 206, the processing device (e.g., the queue manager 310) locates the entry 402 in the logical-to-physical table 302 corresponding to the logical address 404 of the write request. Upon locating the entry 402 in the logical-to-physical table 302 corresponding to the logical address 404 of the write request, the processing device increments the short-term write count 408A for the located entry 402 by one. For example, when the logical address 404 of the received write request is the logical address LOG_1, the processing device increments the short-term write count 408A for the entry $402_1$ from "0000000" to "0000001" at operation 216. As noted above, the short-term write count 408A reflects the number of write operations performed in relation to a corresponding logical address 404 during a prescribed time period. Accordingly, the processing device updates the short-term usage information 408 for the logical address 404 to reflect corresponding wear related to the logical address 404 caused by performance of a write operation.

Figure 7:
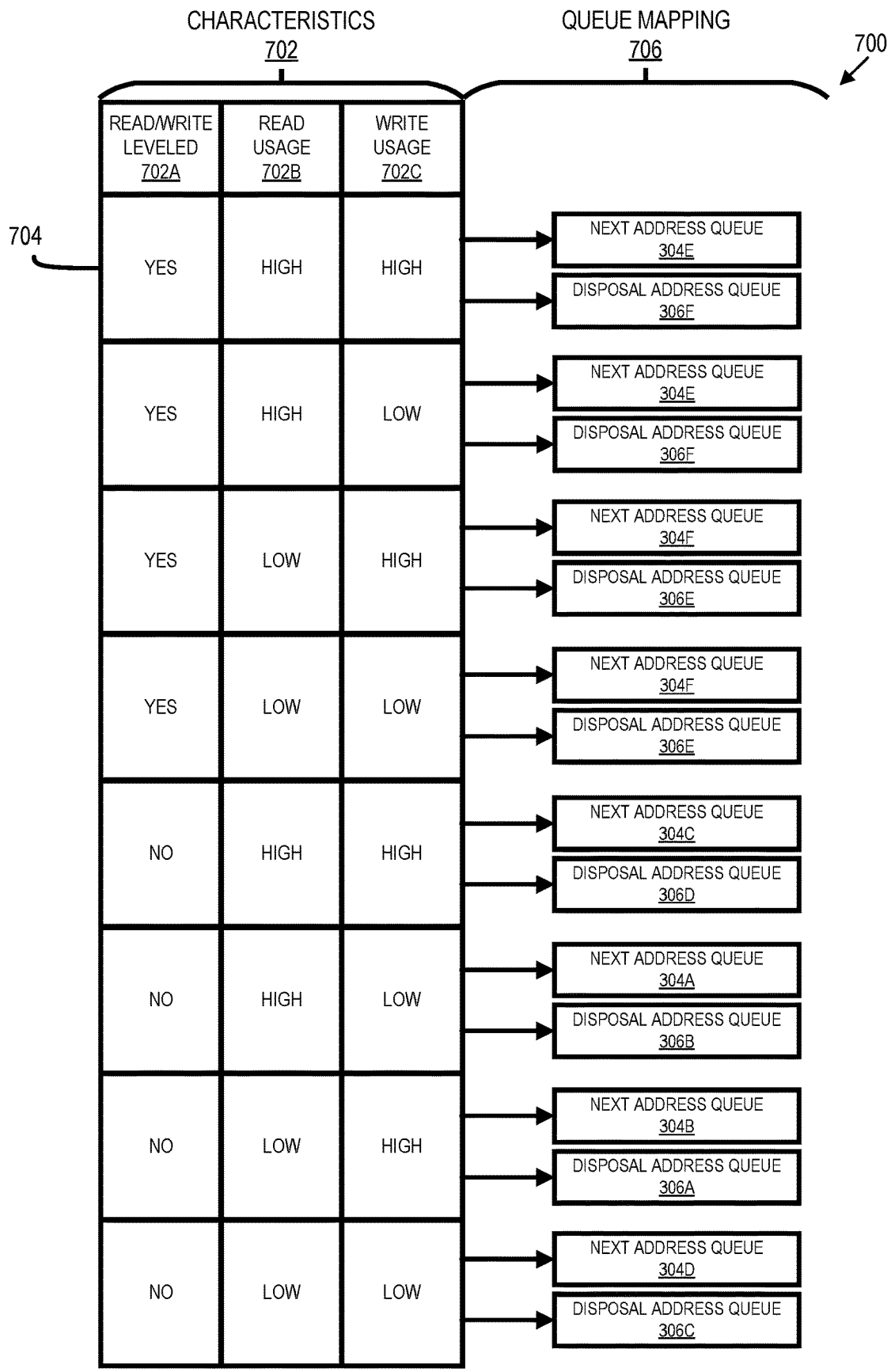
FIG. 7 shows a queue assignment table, in accordance with some embodiments of the present disclosure.

At operation 218, the processing device selects a next address queue 304 from the set of next address queues 304A-304F for the logical address 404 of the write request. In particular, the processing device (e.g., the queue manager 310) selects a next address queue 304 based on one or more of (1) the short-term read count 408B and/or the short-term write count 408A of the logical address 404 of the write request and (2) the history state 408C of the logical address 404 of the write request. As described above, each of the next address queues 304A-304F is associated with a usage profile that corresponds to a set of characteristics. Based on the short-term read count 408B and/or the short-term write count 408A, the processing device can determine a complimentary/reciprocal next address queue 304 for the logical address 404 of the write request (e.g., a next address queue 304 that shares a reciprocal/complimentary relationship with the logical address 404). For example, when the processing device determines that the short-term usage information 408 corresponds to high read usage, low write usage, and unleveled read/write for a logical address 404, the processing device can select a next address queue 304 with low read usage and high write usage (i.e., the short-term usage information 408 has a reciprocal/complimentary relationship with a set of characteristics of the selected next address queue 304). This will ensure that a corresponding physical address 406 selected for a write request will be worn more evenly. Accordingly, a next address queue 304 is selected that compliments the characteristics of the logical address 404 to ensure even wear for physical addresses 406. In one embodiment, the processing device can use the queue assignment table 700 shown in FIG. 7 to determine a next address queue 304 from the set of next address queues 304A-304F for the logical address 404 of the write request. In particular, each entry 704 in the queue assignment table 700 is associated with a set of characteristics 702 (i.e., read/write leveled 702A, read usage 702B, and write usage 702C) and a corresponding queue mapping 706. The processing device uses the short-term read count 408B (corresponding to the read usage 702B), and/or the short-term write count 408A (corresponding to the write usage 702C), including a ratio of the short-term read count 408B and the short-term write count 408A (corresponding to the read/write leveled 702A), to determine a similarity between the short-term usage information/characteristics 408 for the logical address 404 of the write request and the characteristics 702 of entries 704 in the table 700. The processing device can determine a ranking for entries 704 in the queue assignment table 700 based on similarities between characteristics 702 of the entries 704 and characteristics of the logical address 404 (e.g., the short-term read count 408B, the short-term write count 408A, and a ratio of the short-term read count 408B and the short-term write count 408A) such that the processing device selects a next address queue 304 associated with a top-ranked entry 704 for the logical address 404 at operation 218 (e.g., a top-three ranking of next address queues 304 for a particular logical address 404 could be (1) next address queue 304C, (2) next address queue 304E, and (3) next address queue 304A). Accordingly, entries 704 and the next address queues 304 are ranked based on the logical address 404 of the write request. As will be described below, the processing device can use a next best next address queue 304 from this ranking (i.e., the second ranked next address queue 304) when the selected/top ranked next address queue 304 is empty.

In some situations, the short-term usage information 408 can be insufficient to capture accurate characteristics of the logical address 404. For example, when the time period corresponding to the short-term usage information 408 has just commenced, the short-term usage information 408 cannot fully capture current usage of the logical address 404. In these situations, the processing device can rely on the history state 408C, which indicates usage information associated with the associated logical address 404 during a preceding/elapsed time period (e.g., the history state 408C indicates a read and write count for an immediately preceding time period). In particular, the processing device can determine a ranking for entries 704 in the queue assignment table 700 based on similarities between characteristics 702 of the entries 704 and characteristics of the logical address 404 as indicated by the history state 408C such that the processing device selects a next address queue 304 associated with a top-ranked entry 704 for the logical address 404 at operation 218.

In some embodiments, the processing device can use a combination of (1) the short-term write count 408A and the short-term read count 408B and (2) the history state 408C to select a next address queue 304 for the logical address 404 at operation 218. For example, the processing device can separately weight the information provided by the (1) the short-term write count 408A and the short-term read count 408B and (2) the history state 408C to select a next address queue 304 for the logical address 404 based on how much of the time period corresponding to the short-term usage information 408 has elapsed. For instance, the processing device can adjust weights applied to each of (1) the short-term write count 408A and the short-term read count 408B and (2) the history state 408C such that the processing device progressively relies more heavily on the short-term write count 408A instead of the history state 408C as the time period corresponding to the short-term usage information 408 elapses. At a particular point (e.g., after 25% or 50% of the time period has elapsed), the processing device can rely entirely on the short-term write count 408A and the short-term read count 408B for selecting a next address queue 304 from the set of next address queues 304A-304F for the write request at operation 218.

At operation 220, the processing device (e.g., the queue manager 310) determines if the selected next address queue 304 is empty. In particular, the processing device determines if each entry 502 in the selected next address queue 304 does not reference a physical address 406. In response to determining that the selected next address queue 304 is empty, the method 200 moves to operation 222.

At operation 222, the processing device determines if a next-best next address queue 304 for the logical address 404 of the write request is empty. In particular, as described above, the processing device (e.g., the queue manager 310) can rank next address queues 304 in relation to the logical address 404 and select the next address queue 304 with the highest ranking at operation 218. In this example, when the next address queue 304 with the highest ranking is empty, the processing device can determine whether the next address queue 304 with the second highest ranking is empty at operation 222. For example, the processing device could have ranked the next address queue 304F as the top/first ranked next address queue 304 and the next address queue 304D as the second ranked next address queue 304 at operation 218. Based on this ranking, the processing device would have selected the next address queue 304F for the logical address 404 at operation 218. However, when the processing device determines at operation 220 that the next address queue 304F is empty, the processing determines if the next address queue 304D is empty at operation 222. In response to determining that the next best next address queue 304 for the logical address 404 of the write request is not empty at operation 222, the method 200 moves to operation 226 to select the next best next address queue 304 as the next address queue 304 for the logical address 404 (e.g., the next address queue 304D, in the example above). Conversely, in response to determining that the next best next address queue 304 for the logical address 404 of the write request is empty, the method 200 moves to operation 224.

At operation 224, the processing device (e.g., the queue manager 310) swaps the one or more next address queues 304 with one or more disposal address queues 306 (e.g., swaps the physical addresses 406 between next address queues 304 and disposal address queues 306 or swaps the next address queues 304 with the disposal address queues 306 (i.e., swap references to locations in memory where each of the next address queues 304 and disposal address queues 306 are represented)). As described below, the processing device can free physical addresses for reuse by adding them to corresponding disposal address queues 306. As a result of swapping the queues, the next address queue 304 selected at operation 218 is no longer empty. In one embodiment, the processing device swaps all the next address queues 304 with all the corresponding disposal address queues 306 that share characteristics (e.g., the next address queue 304A is swapped with the disposal address queue 306A, the next address queue 304B is swapped with the disposal address queue 306B, etc.). In another embodiment, the processing device only swaps the empty next address queues 304 (e.g., determined at operations 220 and 222) with corresponding disposal address queues 306 that share characteristics. For instance, in the example above, the next address queue 304D is swapped with the disposal address queue 306D and the next address queue 304F is swapped with the disposal address queue 306F but all other next address queues 304 are not swapped with their corresponding disposal queues 306. After the processing device swaps the one or more next address queues 304 with one or more disposal address queues 306 at operation 224, the method returns to operation 220 to determine if the selected next address queue 304 is empty.

Although the method 200 shown in FIGS. 2A-2D shows checking two next address queues 304 before potentially performing a swap operation (i.e., a best next address queue 304 and a single next-best next address queue 304), in other embodiments, the processing device can check more than two next address queues 304 before potentially performing a swap operation. For instance, in the example above in which the processing device ranked the next address queue 304F as the top/first ranked next address queue 304 and the next address queue 304D as the second ranked next address queue 304 at operation 218, the processing device could have ranked the next address queue 304B as the third ranked next address queue 304. In this example, the processing device can determine whether the next address queue 304B is empty before triggering a swap operation.

Figure 8:
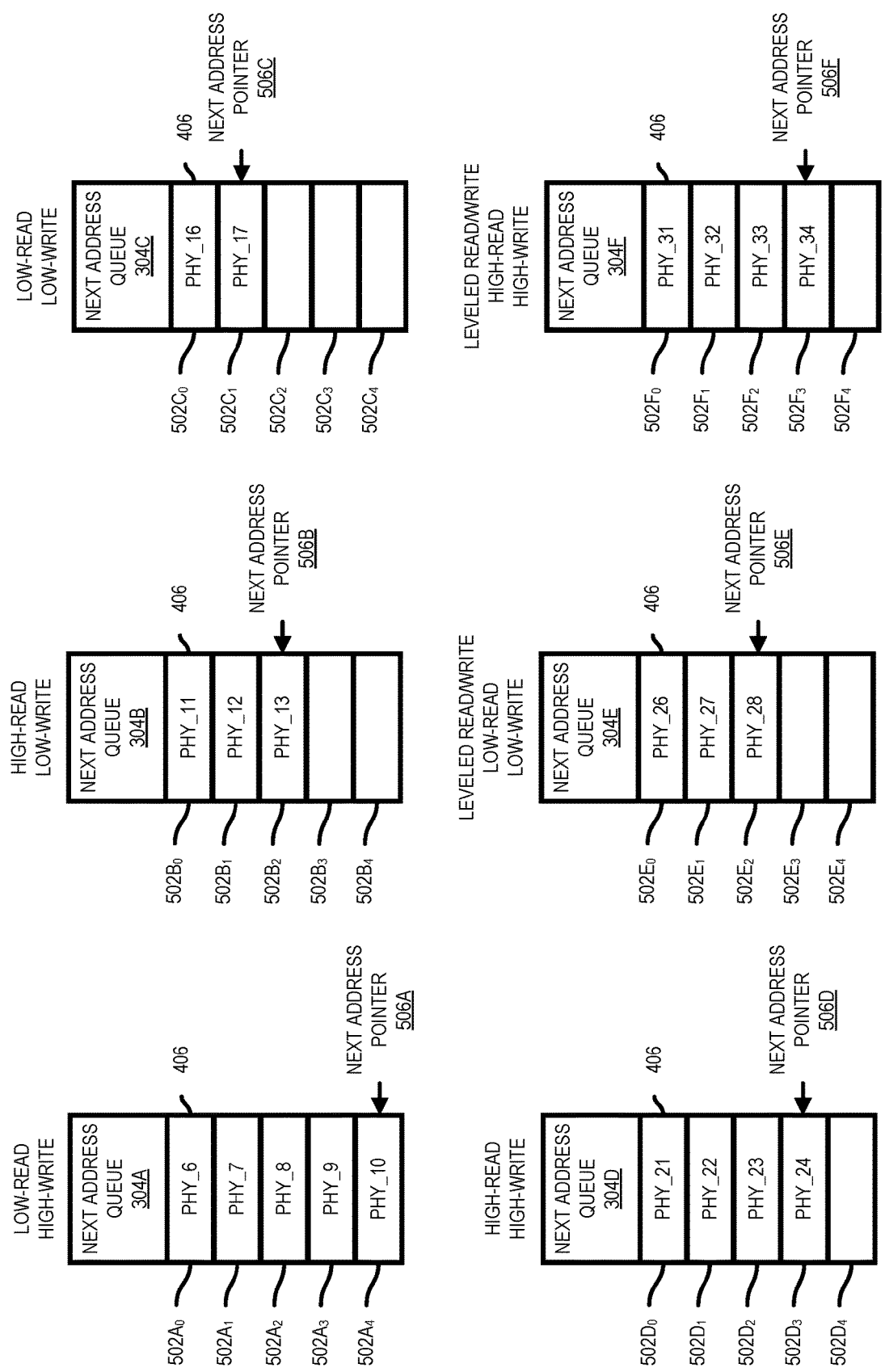
FIG. 8 shows the set of next address queues after removal of a physical address from one of the queues, in accordance with some embodiments of the present disclosure.

Following either operation 226 or operation 220, the method moves to operation 228. At operation 228, the processing device (e.g., the queue manager 310) retrieves/removes the next physical address 406 from the selected next address queue 304. For example, the processing device can use a next address pointer 506 to locate and retrieve/remove the next physical address 406 from the selected next address queue 304 at operation 228. For instance, in the example set of next address queues 304 shown in FIG. 5, the processing device could have selected the next address queue 304F at either operation 218 or operation 226. In the example embodiment shown in FIG. 5, the next physical address 406 from the selected next address queue 304F, is the physical address PHY_35, which is referenced by the next address pointer 506F. Accordingly, as shown in FIG. 8, the processing device retrieves/removes the physical address PHY_35 from the next address queue 304F at operation 228. Retrieving/removing the physical address PHY_35 from the next address queue 304F causes the processing device to also adjust the next address pointer 506F such that the next address pointer 506F now references the next physical address 406 in the next address queue 304F (e.g., the physical address PHY_34 in the entry $502F_3$).

At operation 230, the processing device writes the user data from the received write request to the memory devices 130 using the retrieved/next physical address 406 from operation 228. In the example described above, the retrieved/next physical address 406 is the physical address PHY_35. Accordingly, the processing device writes the user data from the write request to the physical address PHY_35 in the memory devices 130 at operation 230. In some embodiments, writing the user data includes performing ECC encoding on the user data of the write request and writing the encoded user data to the retrieved/next physical address 406 in the memory devices 130.

In one embodiment, the processing device can update long-term information associated with the next physical address 406 following a write operation. For example, as described above, the codeword status table 312 can include a write count for each physical address 406 in the memory devices 130 corresponding to the number of write operations performed for the physical address 406 at any time during the life of the physical address 406. Accordingly, following the processing device performing a write operation with respect to the next physical address 406 at operation 230, the processing device can increment a write count associated with the next physical address 406 in the codeword status table 312. This long-term information in the codeword status table 312 can be used for determining whether a physical address 406 should be retired (e.g., whether a number of write operations performed in relation to a physical address 406 has reached a threshold).

At operation 232, the processing device (e.g., the queue manager 310) updates an entry 402 in the logical-to-physical table 302 corresponding to the logical address 404 of the write request to include the retrieved/next physical address 406 from the selected next address queue 304 instead of an old physical address 406 that previously was associated with the logical address 404. For example, the logical address 404 in the write request can be the logical address LOG_1, which corresponds to the entry $402_1$. Accordingly, as shown in FIG. 9, the entry $402_1$ in the logical-to-physical table 302 corresponding to the logical address LOG_1 is updated to replace the old physical address PHY_1 with the retrieved/next physical address PHY_35. As also shown in FIG. 9, the short-term write count 408A for the entry $402_1$ was updated at operation 216 to reflect a write operation in relation to the logical address LOG_1 (i.e., the short-term write count 408A for the entry $402_1$ is incremented from the value "000000" to "000001" to reflect a write operation).

At operation 234, the processing device determines whether the old physical address 406 should be retired. For example, the processing device (e.g., the queue manager 310) can examine an entry in the codeword status table 312 associated with the old physical address 406 to determine whether the old physical address 406 should be retired. For instance, the processing device can determine that the old physical address 406 is to be retired in response to determining that (1) a write count for the old physical address 406, as indicated in the codeword status table 312, has exceeded, met, or is approaching a retirement write threshold (e.g., 3,000,000 writes) and/or (2) a read count for the old physical address 406, as indicated in the codeword status table 312, has exceeded, met, or is approaching a retirement read threshold (e.g., 10,000,000 writes). In particular, the retirement write threshold and the retirement read threshold indicate the upper limits of read and write operations, respectively, that can be performed on the memory cells associated with a physical address 406 before failure of the physical address 406. Accordingly, the processing device determines that the memory cell associated with the old physical address 406 is at the end of its lifecycle and the old physical address 406 should be retired to avoid potentially losing data when the memory cell eventually fails. Although not shown in relation to processing a read request, in some embodiments, a retirement check can be performed in relation to read operations/requests. Namely, the processing device can determine that a physical address 406 associated with a read request is to be retired in response to determining that (1) a write count for the physical address 406, as indicated in the codeword status table 312, has exceeded, met, or is approaching a retirement write threshold (e.g., 3,000,000 writes) and/or (2) a read count for the physical address 406, as indicated in the codeword status table 312, has exceeded, met, or is approaching a retirement read threshold (e.g., 10,000,000 writes). In response to determining that the old physical address 406 should be retired, the method 200 moves to operation 236.

At operation 236, the processing device (e.g., the queue manager 310) retires the old physical address 406 from use with the set of next address queues 304 and the set of disposal address queues 306. In one embodiment, retiring the old physical address 406 can include the processing device adjusting one or more values in the codeword status table 312. For example, the processing device can set a dead field for the old physical address 406 in the codeword status table 312, which indicates that the memory cell associated with the old physical address 406 is dead and will no longer be used.

Returning to operation 234, in response to determining that the old physical address 406 does not need to be retired, the method 200 moves to operation 238. At operation 238, the processing device selects a disposal address queue 306 for the old physical address 406. In particular, the processing device (e.g., the queue manager 310) selects a disposal address queue 306 for the old physical address 406 based on long-term usage information for the old physical address 406. In one embodiment, the processing device can determine long-term usage information from the codeword status table 312. As described above, the codeword status table 312 maintains long-term usage information in relation to memory elements of the memory devices 130. Accordingly, the processing device can determine which disposal address queue 306 to assign the old physical address 406 based on the long-term usage information provided in the codeword status table 312. In some embodiments, the processing device can use the queue assignment table 700 shown in FIG. 7 to determine a disposal address queue 306 from the set of disposal address queues 306A-306F for the old physical address 406. In particular, similar to operation 218, the processing device can determine a ranking for entries 704 in the queue assignment table 700 based on similarities between characteristics 702 of the entries 704 and long-term usage information of the old physical address 406 (e.g., long-term usage information as indicated in the codeword status table 312), such that the processing device selects a disposal address queue 306 associated with a top-ranked entry 704 for the old physical address 406 at operation 238 (i.e., the disposal address queue 306 with the largest similarity with the long-term usage information of the old physical address 406). In some embodiments, when a selected disposal address queue 306 is full, the processing device can select a disposal address queue 306 associated with a next-best entry 704 in the queue assignment table 700.

Figure 10:
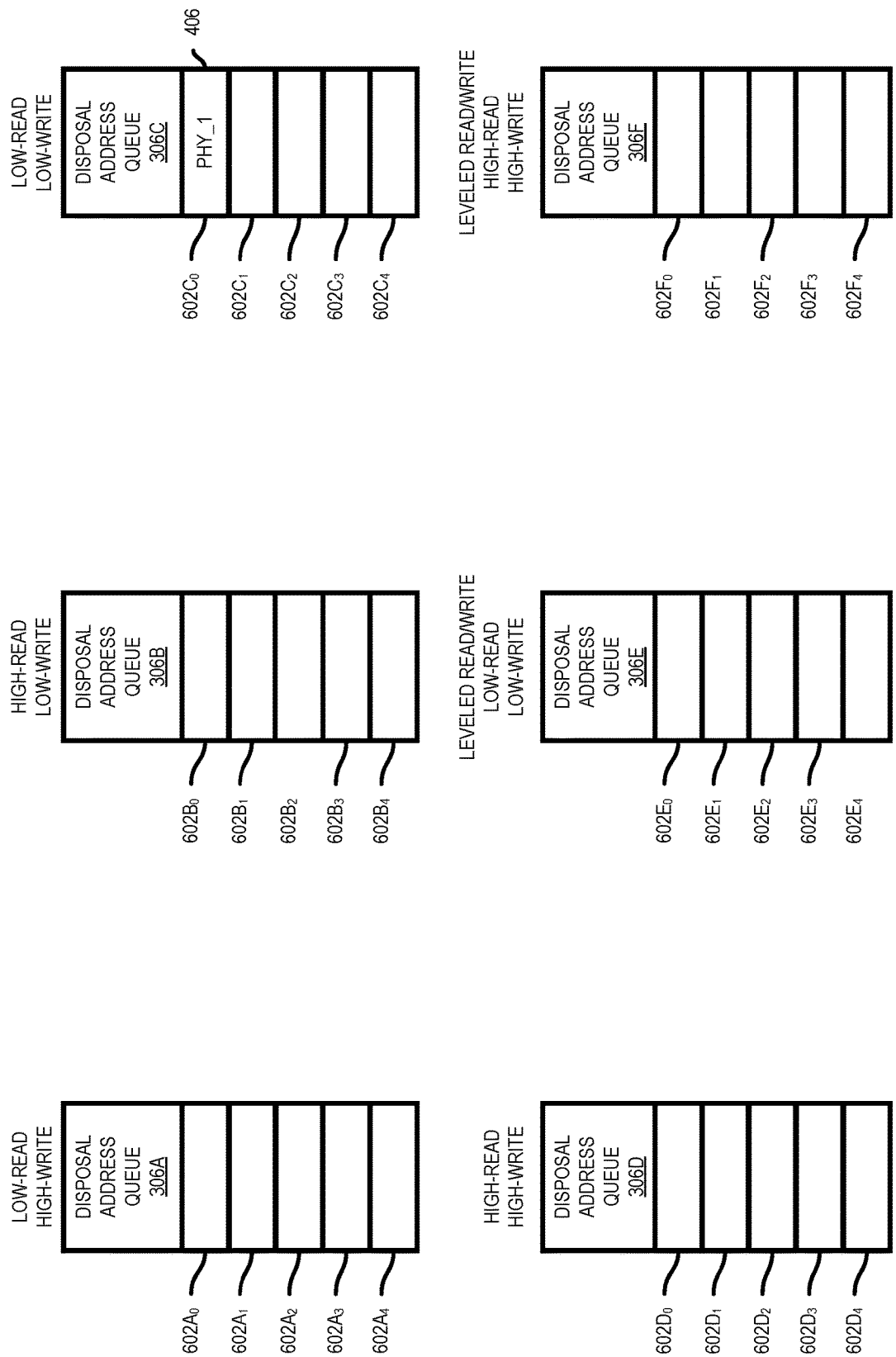
FIG. 10 shows the set of disposal address queues after an old physical address has been added to one of the queues, in accordance with some embodiments of the present disclosure.

At operation 240, the processing device (e.g., the queue manager 310) adds the old physical address to the selected disposal address queue 306. For example, in FIG. 10, the old physical address 406 has been added to the disposal address queue 306C. In particular, the old physical address 406 is the physical address PHY_1 and the processing device has added the physical address PHY_1 to the entry $602C_0$ in the disposal address queue 306C.

At operation 242, the processing device (e.g., the queue manager 310) determines whether a depth monitoring triggering event has occurred. The depth monitor 308 of the wear leveler 113 can monitor the next address queues 304 and the disposal address queues 306 for determining the occurrence of a depth monitoring triggering event and the depth monitoring triggering events indicate whether the level of the next address queues 304 is low enough or the level of the disposal address queues 306 is high enough to warrant a swap operation between the next address queues 304 and the disposal address queues 306. In one embodiment, the depth triggering events include one or more of (1) the average number of filled entries 502 in the next address queues 304 is below a depth threshold (i.e., the average number of physical addresses 406 in the next address queues 304 is below a depth threshold), (2) the number of filled entries 502 in any next address queue 304 is below the depth threshold, (3) the average number of filled entries 602 in the disposal address queues 306 is above a high level threshold (i.e., the average number of physical addresses 406 in the disposal address queues 306 is above high level threshold), and (4) the number of filled entries 602 in any disposal address queue 306 is above the high level threshold. In response to the processing device determining that a depth monitoring triggering event has occurred, the method 200 moves to operation 244.

At operation 244, the processing device (e.g., the queue manager 310) swaps one or more next address queues 304 with one or more disposal address queues 306. Similar to operation 224, the processing device can swap all the next address queues 304 with all the corresponding disposal address queues 306 that share characteristics (e.g., the next address queue 304A is swapped with the next address queue 306A, the next address queue 304B is swapped with the next address queue 306B, etc.), or the processing device can swap a subset of the next address queues 304 with corresponding disposal address queues 306 (i.e., swap only those next address queues 304 with corresponding disposal address queues 306 whose depth is below the depth threshold). Although described as entirely swapping one or more next address queues 304 with one or more disposal address queues 306 (i.e., all the physical addresses 406 from the one or more disposal address queues 306 are moved to corresponding next address queues 304), in some embodiments, the processing device can perform a partial swap at operation 244. Namely, the processing device can move a subset of the physical addresses 406 from the one or more disposal address queues 306 to corresponding next address queues 304.

Returning to operation 242, in response to the processing device determining that a depth monitoring triggering event has not occurred or following completion of either of the operations 212 or 244, the method 200 moves to operation 246. At operation 246, the processing device (e.g., the queue manager 310) determines whether a short-term read/write count triggering event has occurred. In one embodiment, a short-term read/write count triggering event can be the end of the time period associated with the short-term usage information 408 (e.g., 5 microseconds have elapsed). In response to the processing device determining that a short-term read/write count triggering event has not occurred, the method 200 moves to point A in the method 200, to await either a write request or a read request.

Conversely, in response to the processing device determining that a short-term read/write count triggering event has occurred, the method 200 moves to operation 248. At operation 248, the processing device (e.g., the queue manager 310) resets the short-term usage information 408 for each entry 402 in the logical-to-physical table 302. In one embodiment, the processing device resets the short-term usage information 408 by setting a history state 408C for each entry 402 in the logical-to-physical table 302 based on the short-term write count 408A and the short-term read count 408B such that the history state 408C reflects short-term usage information for each logical address 404 in the expired time period. In this embodiment, the processing device sets the short-term write count 408A and the short-term read count 408B to zero. Accordingly, the short-term usage information 408 is set to reflect the new/next time period.

Following operation 248 or upon the processing device determining at operation 246 that a short-term read/write count triggering event has not occurred, the method 200 returns to point A in the method 200, to await either a write request or a read request.

As described above, through the use of a set of address queues/tables (e.g., the logical-to-physical table 302, the next address queue 304, and the disposal address queue 306), the wear leveler 113 can wear level memory cells in the memory devices 130 with minimal overhead (i.e., minimum use of memory and computational resources). Namely, the memory subsystem 110 can efficiently wear level memory cells without needing to track detailed statistics for each memory cell by using the next address queue 304 and the disposal address queue 306 as described above.

Figure 11:
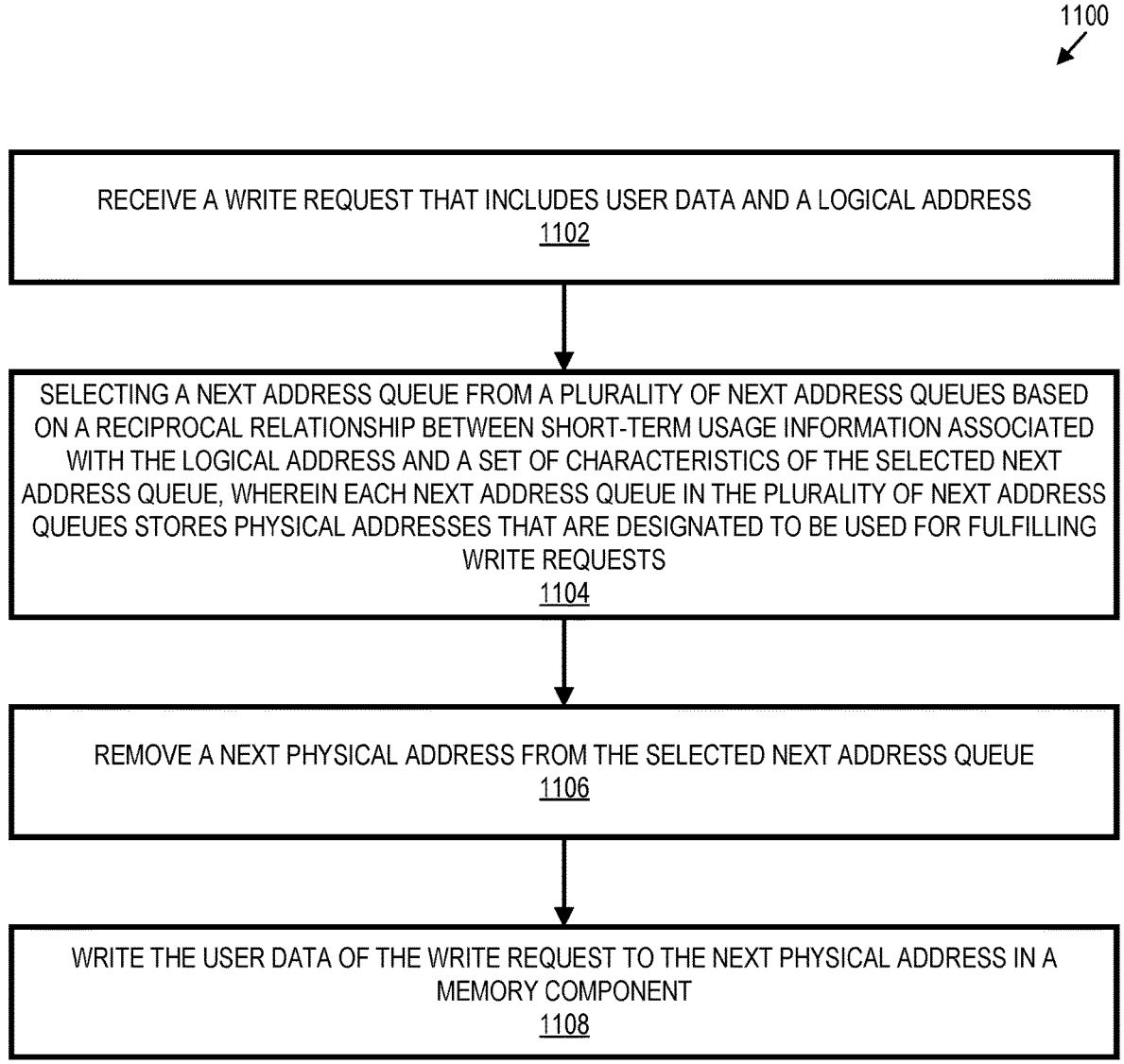
FIG. 11 is a flow diagram of another example method to perform profile and queue-based wear leveling, in accordance with some embodiments of the present disclosure.

FIG. 11 is a flow diagram of another example method 1100 to perform profile and queue-based wear leveling, in accordance with some embodiments of the present disclosure. The method 1100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 1100 is performed by the wear leveler 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 1102, the processing device receives a write request that includes user data and a logical address 404. The write request can be received from the host system 120 or may be internally generated by the memory subsystem 110. Further, the logical address 404 of the write request corresponds to an entry 402 in the logical-to-physical table 302 that is managed by the processing device.

At operation 1104, the processing device selects a next address queue 304 from a plurality of next address queues 304 based on a reciprocal relationship between short-term usage information 408 associated with the logical address 404 and a set of characteristics of the selected next address queue 404. As described herein, each next address queue 304 in the set of next address queues 304 stores physical addresses 406 that are designated to be used for fulfilling write requests and physical addresses 406 in each next address queue 304 in the set of next address queues 304 share a set of characteristics amongst other physical addresses 406 in the same next address queue 304.

At operation 1106, the processing device removes a next physical address 406 from the selected next address queue 304. As described above, the selected next address queue 304 stores physical addresses 406 that are designated to be used for fulfilling write requests. For example, the processing device can use a next address pointer 506 to locate and remove the next physical address 406 from the next address queue 304 at operation 1106 for fulling the write request received at operation 1102.

At operation 1108, the processing device writes the user data of the write request to the next physical address 406 in a memory device 130/140.

Figure 12:
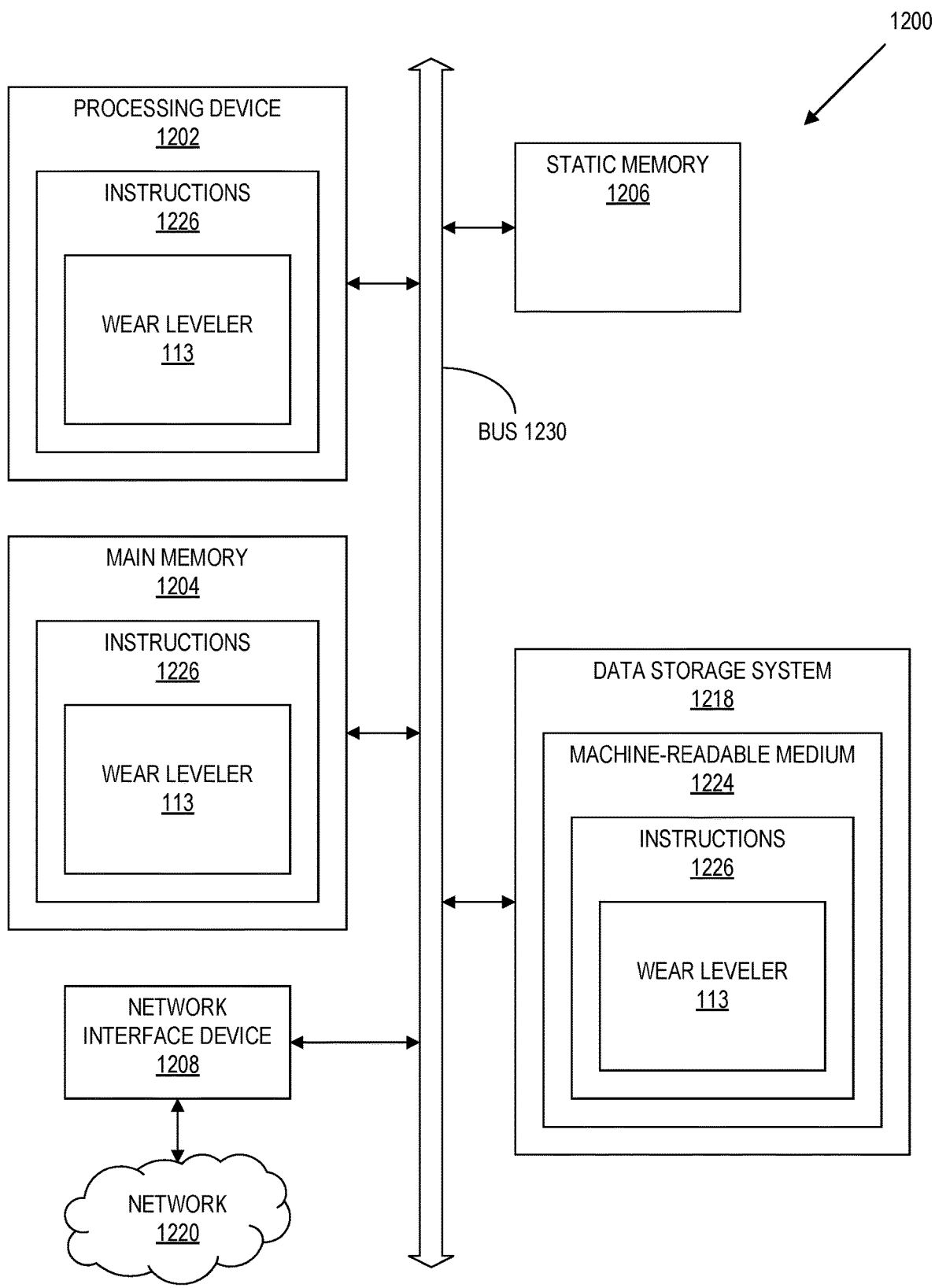
FIG. 12 is a block diagram of an example computer system in which embodiments of the present disclosure may operate.

FIG. 12 illustrates an example machine of a computer system 1200 within which a set of instructions, for causing the machine to perform any one or more of the methodologies discussed herein, can be executed. In some embodiments, the computer system 1200 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the wear leveler 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage system 1218, which communicate with each other via a bus 1230.

Processing device 1202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 can also be one or more special-purpose processing devices such as an application specific integrated circuit (ASIC), a field programmable gate array (FPGA), a digital signal processor (DSP), network processor, or the like. The processing device 1202 is configured to execute instructions 1226 for performing the operations and steps discussed herein. The computer system 1200 can further include a network interface device 1208 to communicate over the network 1220.

The data storage system 1218 can include a machine-readable storage medium 1224 (also known as a computer-readable medium) on which is stored one or more sets of instructions 1226 or software embodying any one or more of the methodologies or functions described herein. The instructions 1226 can also reside, completely or at least partially, within the main memory 1204 and/or within the processing device 1202 during execution thereof by the computer system 1200, the main memory 1204 and the processing device 1202 also constituting machine-readable storage media. The machine-readable storage medium 1224, data storage system 1218, and/or main memory 1204 can correspond to the memory subsystem 110 of FIG. 1.

In one embodiment, the instructions 1226 include instructions to implement functionality corresponding to a wear leveler (e.g., the wear leveler 113 of FIG. 1). While the machine-readable storage medium 1224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving a write request that includes user data and a logical address;
selecting a next address queue from a plurality of next address queues based on a reciprocal relationship between short-term usage information associated with the logical address and a set of characteristics of the selected next address queue, wherein each next address queue in the plurality of next address queues stores physical addresses that are designated to be used for fulfilling write requests;
removing a next physical address from the selected next address queue; and
writing the user data of the write request to the next physical address in a memory device,
wherein the set of characteristics include one or more of (1) a number of read operations performed for a physical address in relation to a read threshold, (2) a number of write operations performed for a physical address in relation to a write threshold, and (3) a ratio of a number of read operations and a number of write operations performed for a physical address in relation to a leveling threshold.

2. The method of claim 1, further comprising:
locating, in a logical-to-physical table, an entry associated with the logical address of the write request, wherein the logical-to-physical table maps logical addresses to physical addresses and the entry includes an old physical address that is mapped to the logical address of the write request;
selecting a disposal address queue from a set of disposal address queues based on long-term usage information associated with the old physical address, wherein each disposal address queue in the set of disposal address queues stores physical addresses, wherein the selected disposal address queue is selected based on similarities between long-term usage information associated with the old physical address and a set of characteristics of the selected disposal address queue; and
adding the old physical address to the selected disposal address queue.

3. The method of claim 2, further comprising:
transferring the physical addresses from one or more disposal address queues in the set of disposal address queues into corresponding one or more next address queues in the plurality of next address queues in response to detecting that a number of physical addresses in one or more of the next address queues in the plurality of next address queues is below a depth threshold.

4. The method of claim 2, further comprising:
replacing the old physical address in the entry of the logical-to-physical table with the next physical address.

5. The method of claim 2, wherein the short-term usage information for each logical address represented in the logical-to-physical table includes one or more of (1) a short-term read count that indicates a number of read operations performed in relation to a corresponding logical address during a current time period, (2) a short-term write count that indicates a number of write operations performed in relation to a corresponding logical address during the current time period, and (3) a history state that indicates a number of read and write operations performed in relation to a corresponding logical address during a preceding time period.

6. The method of claim 5, further comprising:
detecting expiration of the current time period;
setting, in response to detecting expiration of the current time period, a history state for each logical address represented in the logical-to-physical table based on associated short-term read and short-term write counts for a corresponding logical address; and resetting, in response to detecting expiration of the current time period, a short-term read count and a short-term write count for each logical address represented in the logical-to-physical table.

7. The method of claim 5, further comprising:

incrementing, in response to receipt of the write request, a short-term write count associated with the logical address.

8. The method of claim 5, further comprising:

receiving a read request that includes the logical address; and incrementing, in response to receipt of the read request, a short-term read count associated with the logical address.

9. The method of claim 1, further comprising:

locating, in a logical-to-physical table, an entry associated with the logical address of the write request, wherein the logical-to-physical table maps logical addresses to physical addresses and the entry includes an old physical address that is mapped to the logical address of the write request;

determining to retire the old physical address based on a total number of read operations or a total number of write operations performed in relation to the old physical address; and retiring the old physical address by storing an indication that the old physical address is not to be utilized for performing write operations.

10. The method of claim 1, wherein the next physical address in the next address queue is referenced by a next address pointer, and wherein the next physical address corresponds to one of a codeword, a memory cell, or a logical block in the memory device.

11. A system comprising:

a memory device; and a processing device, operatively coupled with the memory device, to:

receive a write request that includes user data and a logical address;

select a next address queue from a plurality of next address queues based on a reciprocal relationship between short-term usage information associated with the logical address and a set of characteristics of the selected next address queue, wherein each next address queue in the plurality of next address queues stores physical addresses that are designated to be used for fulfilling write requests;

remove a next physical address from the selected next address queue; and write, in the memory device, the user data of the write request at a next physical address from the selected next address queue, wherein the set of characteristics include one or more of (1) a number of read operations performed for a physical address, (2) a number of write operations performed for a physical address, and (3) a ratio of a number of read operations and a number of write operations performed for a physical address.

12. The system of claim 11, wherein the processing device is further to:

locate, in a logical-to-physical table, an entry associated with the logical address of the write request, wherein the logical-to-physical table maps logical addresses to physical addresses and the entry includes an old physical address that is mapped to the logical address of the write request;

select a disposal address queue from a set of disposal address queues based on long-term usage information associated with the old physical address, wherein each disposal address queue in the set of disposal address queues stores physical addresses, wherein the selected disposal address queue is selected based on similarities between long-term usage information associated with the old physical address and a set of characteristics of the selected disposal address queue; and add the old physical address to the selected disposal address queue, and wherein the set of characteristics include one or more of (1) a number of read operations performed for a physical address in relation to a read threshold, (2) a number of write operations performed for a physical address in relation to a write threshold, and (3) a ratio of a number of read operations and a number of write operations performed for a physical address in relation to a leveling threshold.

13. The system of claim 12, wherein the processing device is further to:

transfer the physical addresses from one or more disposal address queues in the set of disposal address queues into corresponding one or more next address queues in the plurality of next address queues in response to detecting that a number of physical addresses in one or more of the next address queues in the plurality of next address queues is below a depth threshold.

14. The system of claim 12, wherein the processing device is further to:

replace the old physical address in the entry of the logical-to-physical table with the next physical address.

15. The system of claim 12, wherein the short-term usage information for each logical address represented in the logical-to-physical table includes one or more of (1) a short-term read count that indicates a number of read operations performed in relation to a corresponding logical address during a current time period, (2) a short-term write count that indicates a number of write operations performed in relation to a corresponding logical address during the current time period, and (3) a history state that indicates a number of read and write operations performed in relation to a corresponding logical address during a preceding time period.

16. The system of claim 15, wherein the processing device is further to:

detect expiration of the current time period;

set, in response to detecting expiration of the current time period, a history state for each logical address represented in the logical-to-physical table based on associated short-term read and short-term write counts for a corresponding logical address; and reset, in response to detecting expiration of the current time period, a short-term read count and a short-term write count for each logical address represented in the logical-to-physical table.

17. The system of claim 15, wherein the processing device is further to:

increment, in response to receipt of the write request, a short-term write count associated with the logical address.

18. The system of claim 15, wherein the processing device is further to:

receive a read request that includes the logical address; and increment, in response to receipt of the read request, a short-term read count associated with the logical address.

19. A non-transitory computer-readable storage medium comprising instructions that, when executed by a processing device, cause the processing device to:

receive a write request that includes user data and a logical address;

select a next address queue from a plurality of next address queues based on a reciprocal relationship between short-term usage information associated with the logical address and a set of characteristics of the selected next address queue, wherein each next address queue in the plurality of next address queues stores physical addresses that are designated to be used for fulfilling write requests;

remove a next physical address from the selected next address queue; and write the user data of the write request to the next physical address in a memory device, wherein the set of characteristics include one or more of (1) a number of read operations performed for a physical address in relation to a read threshold, (2) a number of write operations performed for a physical address in relation to a write threshold, and (3) a ratio of a number of read operations and a number of write operations performed for a physical address in relation to a leveling threshold.

20. The non-transitory computer-readable storage medium of claim 19, wherein the instructions, when executed by the processing device, cause the processing device to:

locate, in a logical-to-physical table, an entry associated with the logical address of the write request, wherein the logical-to-physical table maps logical addresses to physical addresses and the entry includes an old physical address that is mapped to the logical address of the write request;

select a disposal address queue from a set of disposal address queues based on long-term usage information associated with the old physical address, wherein each disposal address queue in the set of disposal address queues stores physical addresses, wherein the selected disposal address queue is selected based on similarities between long-term usage information associated with the old physical address and a set of characteristics of the selected disposal address queue; and add the old physical address to the selected disposal address queue.

* * * * *